(12) United States Patent
Eronen et al.

(10) Patent No.: US 11,089,426 B2
(45) Date of Patent: Aug. 10, 2021

(54) APPARATUS, METHOD OR COMPUTER PROGRAM FOR RENDERING SOUND SCENES DEFINED BY SPATIAL AUDIO CONTENT TO A USER

(71) Applicant: Nokia Technologies Oy, Espoo (FI)

(72) Inventors: Antti Johannes Eronen, Tampere (FI); Lasse Juhani Laaksonen, Tampere (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/743,187

(22) Filed: Jan. 15, 2020

(65) Prior Publication Data

US 2020/0252739 A1 Aug. 6, 2020

(30) Foreign Application Priority Data

Feb. 6, 2019 (EP) .................................... 19155843

(51) Int. Cl.
*H04R 5/02* (2006.01)
*H04S 7/00* (2006.01)

(52) U.S. Cl.
CPC .............. *H04S 7/303* (2013.01); *H04S 7/305* (2013.01)

(58) Field of Classification Search
CPC ................................ H04S 7/303; H04S 7/305
USPC .................................................. 381/310, 311
See application file for complete search history.

(56) References Cited

U.S. PATENT DOCUMENTS

2016/0123745 A1* 5/2016 Cotier ..................... G06F 1/163
701/467

OTHER PUBLICATIONS

Maillet et al., Steerable Playlist Generation by Learning Song Similarity from Radio Station Playlists, 10th International Society for Music Information Retrieval Conference (ISMIR 2009), Jan., 2009, pp. 345-350.
European Application No. 19152619.3, "Processing Audio Signals", filed on Jan. 18, 2019, 31 pages.
Extended European Search Report received for corresponding European Patent Application No. 19155843.6, dated Jul. 12, 2019, 7 pages.

* cited by examiner

*Primary Examiner* — Ammar T Hamid
(74) *Attorney, Agent, or Firm* — Harrington & Smith

(57) ABSTRACT

An apparatus comprising means for:
in a first mode rendering sound scenes defined by a spatial audio content to a user, wherein a current sound scene is selected by a current point-of-view of the user; and
in a second mode,
automatically determining, at least in part, a sequence of notional points-of-view of the user in dependence upon the spatial audio content; and
rendering sound scenes defined by the spatial audio content to a user, wherein a sequence of sound scenes are selected by the sequence of notional points-of-view of the user.

20 Claims, 13 Drawing Sheets

Figure 1A:
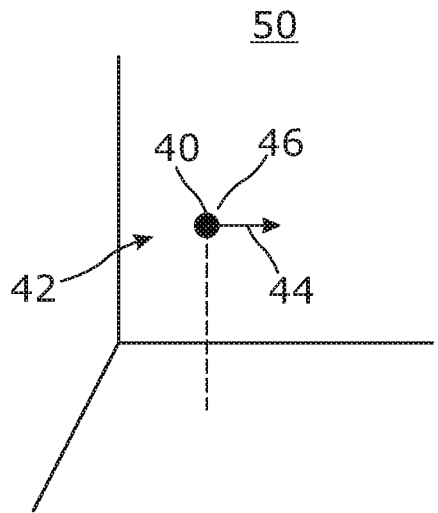

APPARATUS, METHOD OR COMPUTER PROGRAM FOR RENDERING SOUND SCENES DEFINED BY SPATIAL AUDIO CONTENT TO A USER

TECHNOLOGICAL FIELD

Embodiments of the present invention relate to apparatuses, methods and computer programs for rendering sound scenes defined by spatial audio content to a user.

BACKGROUND

Immersive audio describes the rendering to a user of audio content selected by a current point-of-view of the user. The user therefore has the experience that they are immersed within an audio field (e.g. a three-dimensional audio field) that changes as their point-of-view changes.

The point-of-view can have different degrees of freedom (DoF). For example, a point-of-view could be determined by orientation only (e.g. the three degrees of three-dimensional orientation 3DoF). Alternatively a point-of-view could be determined by both orientation and location (e.g. the three degrees of three-dimensional orientation and the three degrees of three-dimensional location), and a change in location (e.g. the three degrees of three-dimensional location) may be determined by a change in location relative to the user that can arise from a postural change of a user's head and/or body (3DoF+) or may be a translation of the user through real space by, for example, walking (6DoF).

The degrees of freedom available for a point-of-view of a user can be limited by the ability of the user to change location.

BRIEF SUMMARY

According to various, but not necessarily all, embodiments there is provided an apparatus comprising means for:
in a first mode rendering virtual sound scenes defined by a spatial audio content to a user, wherein a current virtual sound scene is selected by a current point-of-view of the user; and
in a second mode,
determining, at least in part, a sequence of notional points-of-view of the user in dependence upon the spatial audio content; and
rendering virtual sound scenes defined by the spatial audio content to the user, wherein a sequence of virtual sound scenes are selected by the sequence of notional points-of-view of the user.

In some but not necessarily all examples, the first mode enables N DoF mediated reality where N=6 or 3 and the second mode enables M DoF mediated reality where M=3 or 0, and M<N.

In some but not necessarily all examples, a point-of-view is a combination of location and orientation, and wherein determining, at least in part, a sequence of notional points-of-view of the user in dependence upon the spatial audio content; determines at least locations for the notional points-of-view of the user.

In some but not necessarily all examples, a current point-of-view of the user determines a current orientation for the notional points-of-view of the user.

In some but not necessarily all examples, the spatial audio content comprises, in a playlist, first spatial audio content and second spatial audio content, wherein the first spatial audio content enables rendering to the user a first virtual sound scene defined by the first spatial audio content and selected by a notional or current point-of-view of the user; wherein the second spatial audio content enables rendering to the user a second virtual sound scene defined by the second spatial audio content and selected by a notional or current point-of-view of the user.

In some but not necessarily all examples, the apparatus comprises means for, in the second mode: determining a first set of one or more notional points-of-view of the user for the first spatial audio content;
determining a second set of one or more notional points-of-view of the user for the second spatial audio content;
rendering first virtual sound scenes defined by the first spatial audio content to the user, wherein the first virtual sound scenes are selected by one or more notional points-of-view of the user from the determined first set of one or more notional points-of-view of the user and then rendering the second virtual sound scenes defined by the second spatial audio content to the user, wherein the second virtual sound scenes are selected by one or more notional points-of-view of the user from the determined second set of one or more notional points-of-view of the user,
wherein
the selected one or more notional points-of-view of the user from the determined first set of one or more notional points-of-view of the user define a first trajectory of a virtual user through a first sound space, and
the selected one or more notional points-of-view of the user from the determined second set of one or more notional points-of-view of the user define a second trajectory of the virtual user through a second sound space.

In some but not necessarily all examples, the apparatus further comprises means for enabling varying the first trajectory and/or the second trajectory.

In some but not necessarily all examples, the means for enabling varying the first trajectory and/or the second trajectory is user controlled during rendering and/or wherein the means for enabling varying the first trajectory and/or the second trajectory is automatically controlled to vary a trajectory with a subsequent rendering of the same content.

In some but not necessarily all examples, the spatial audio content is associated with metadata comprising at least a first parameter, wherein the first trajectory and/or the second trajectory is based on at least the first parameter, and maintaining similarity of the parameter across a transition between the first spatial audio content and the second spatial audio content.

In some but not necessarily all examples, the first trajectory and/or the second trajectory is based on both the first spatial audio content and the second spatial audio content.

In some but not necessarily all examples, the apparatus comprises:
means for determining a cost function that assigns a cost for a putative trajectory through the first spatial audio content and the second spatial audio content;
means for using the cost function to determine at least a portion of the first trajectory and/or the second trajectory.

In some but not necessarily all examples, a last portion of the first trajectory and a first portion of the second trajectory results in the last portion of the first spatial audio content, rendered according to the last portion of the first trajectory, being stylistically similar to the first portion of the second spatial audio content, rendered according to the first portion of the second trajectory, wherein stylistic similarity is determined based on clustering within a parameter space, wherein the parameters of the parameter space are selected from one or more of: spectral frequencies; pitch; key; melody; instrumentation; voice; mood; sound object timbre, style.

In some but not necessarily all examples, the apparatus comprises means for changing: a last portion of the first trajectory; a first portion of the second trajectory; the first spatial audio content; the second spatial audio content.

According to various, but not necessarily all, embodiments there is provided a method comprising:
in a first mode rendering virtual sound scenes defined by a spatial audio content to a user, wherein a current virtual sound scene is selected by a current point-of-view of the user; and
in a second mode, determining, at least in part, a sequence of notional points-of-view of the user in dependence upon the spatial audio content; and rendering virtual sound scenes defined by the spatial audio content to a user, wherein a sequence of virtual sound scenes are selected by the sequence of notional points-of-view of the user.

According to various, but not necessarily all, embodiments there is provided a computer program that when run by a processor causes:
in a first mode rendering virtual sound scenes defined by a spatial audio content to a user, wherein a current virtual sound scene is selected by a current point-of-view of the user; and
in a second mode, automatically determining, at least in part, a sequence of notional points-of-view of the user in dependence upon the spatial audio content; and
rendering virtual sound scenes defined by the spatial audio content to a user, wherein a sequence of virtual sound scenes are selected by the sequence of notional points-of-view of the user.

According to various, but not necessarily all, embodiments there is provided an apparatus comprising:
at least one processor; and
at least one memory including computer program code
the at least one memory and the computer program code configured to, with the at least one processor, cause the apparatus at least to perform:
in a first mode rendering virtual sound scenes defined by a spatial audio content to a user, wherein a current virtual sound scene is selected by a current point-of-view of the user; and
in a second mode, determining, at least in part, a sequence of notional points-of-view of the user in dependence upon the spatial audio content; and rendering virtual sound scenes defined by the spatial audio content to a user, wherein a sequence of virtual sound scenes are selected by the sequence of notional points-of-view of the user.

According to various, but not necessarily all, embodiments there is provided examples as claimed in the appended claims.

The same content is re-usable when the degrees of freedom become limited by changing from the first mode to the second mode.

BRIEF DESCRIPTION

Figure 2:
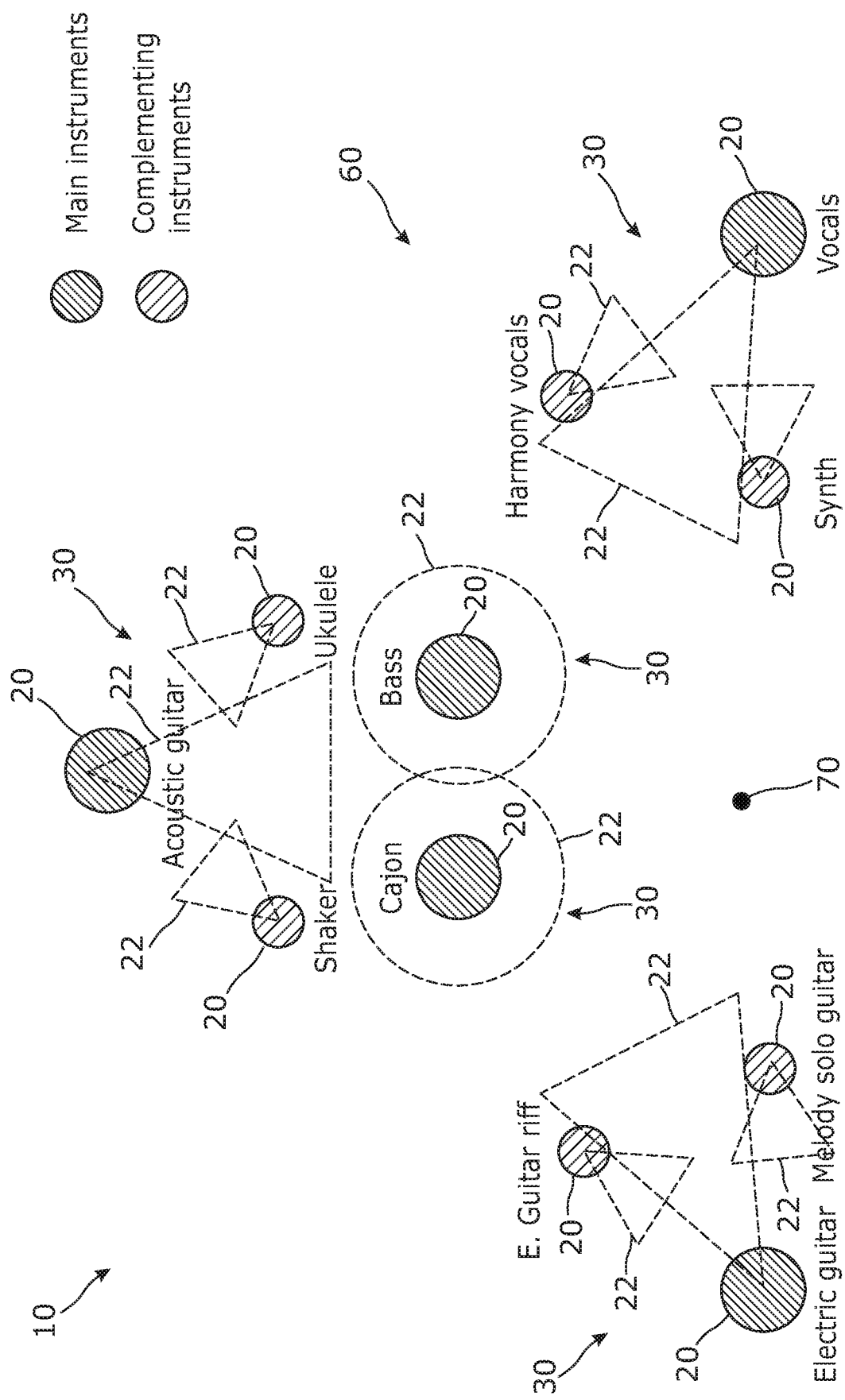
Figure 3:
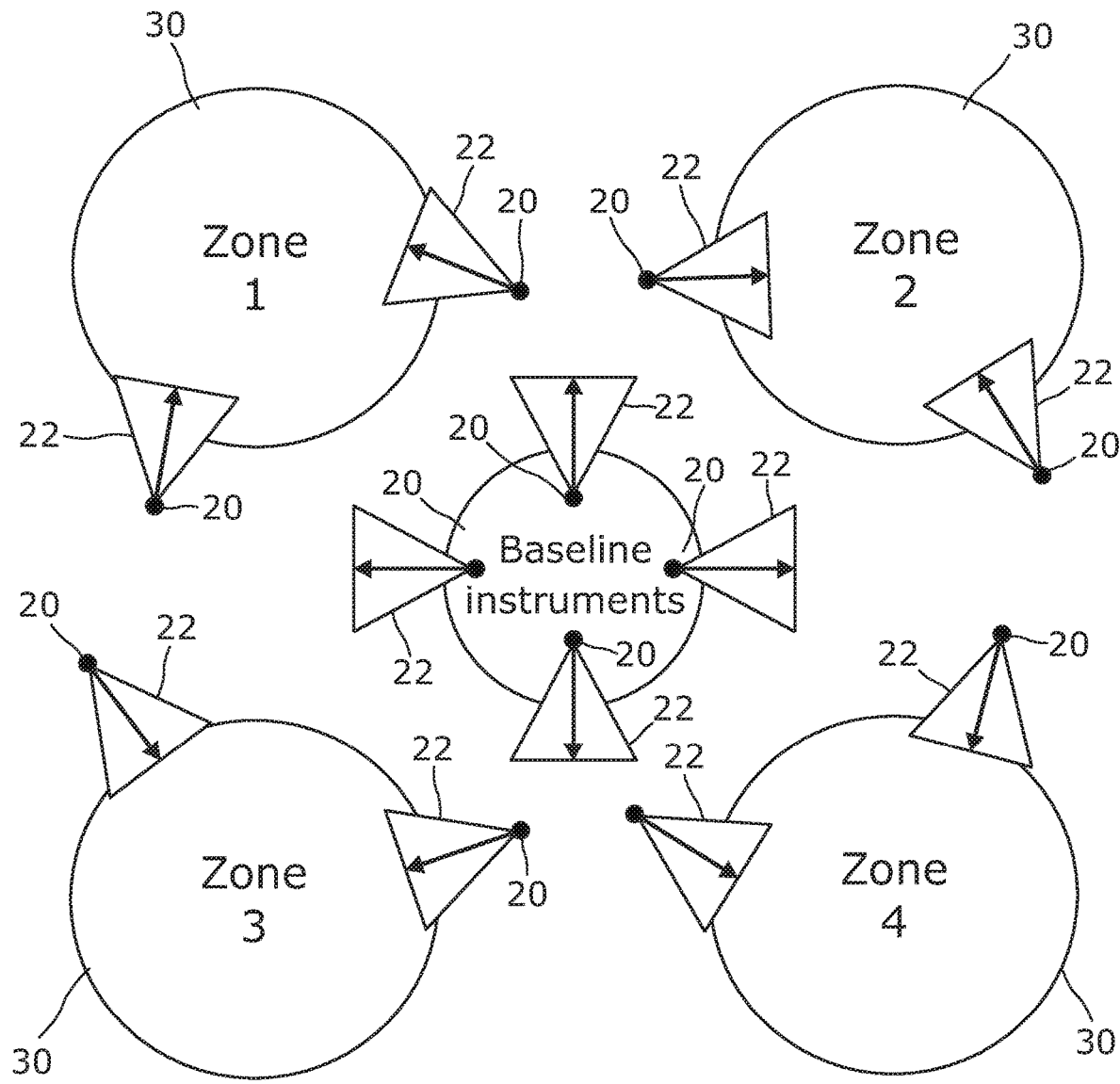
Figure 4:
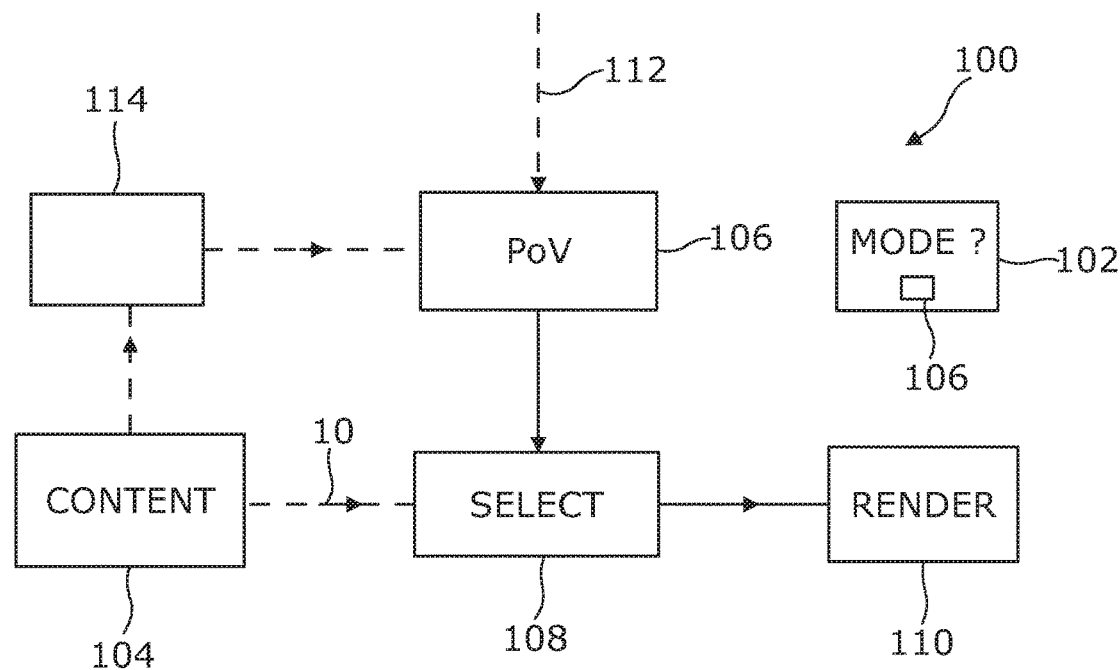
Figure 5:
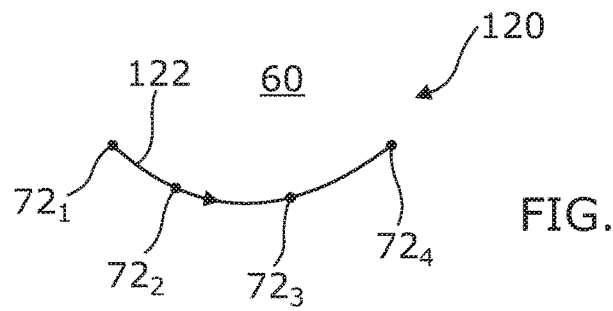
Figure 6:
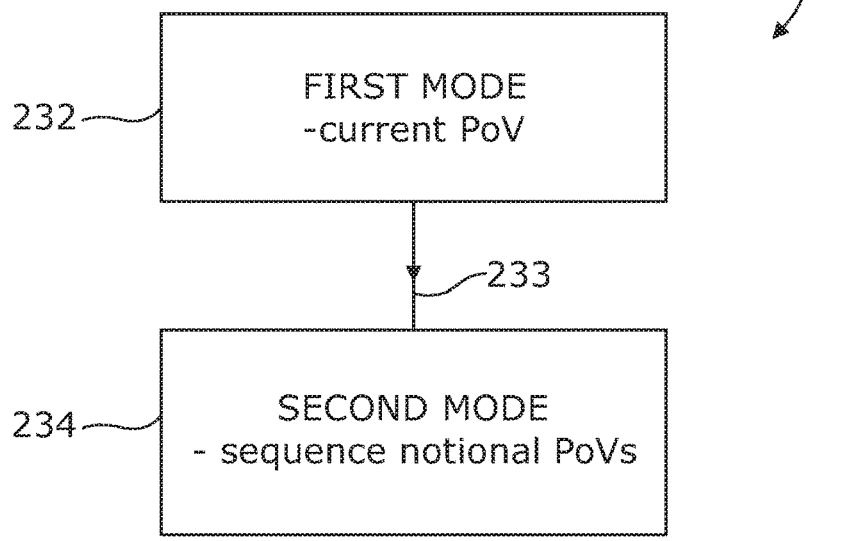
Figure 7:
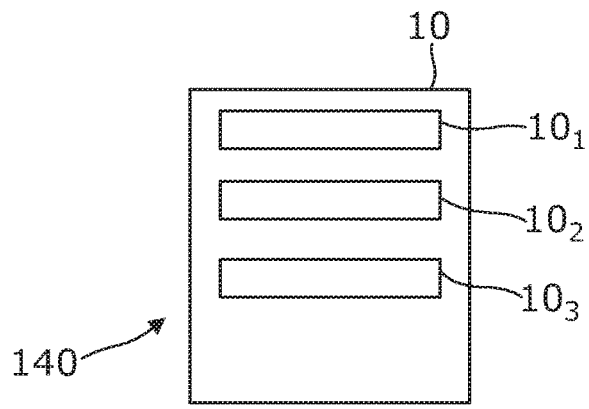
Figure 8A:
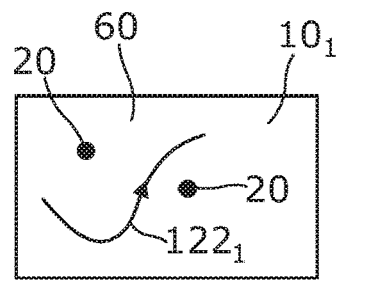
Figure 8B:
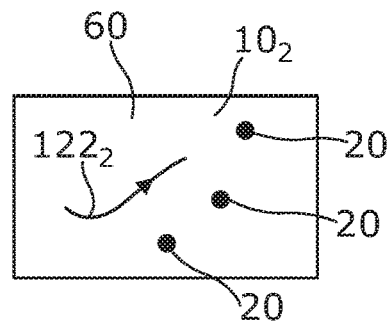
Figure 9:
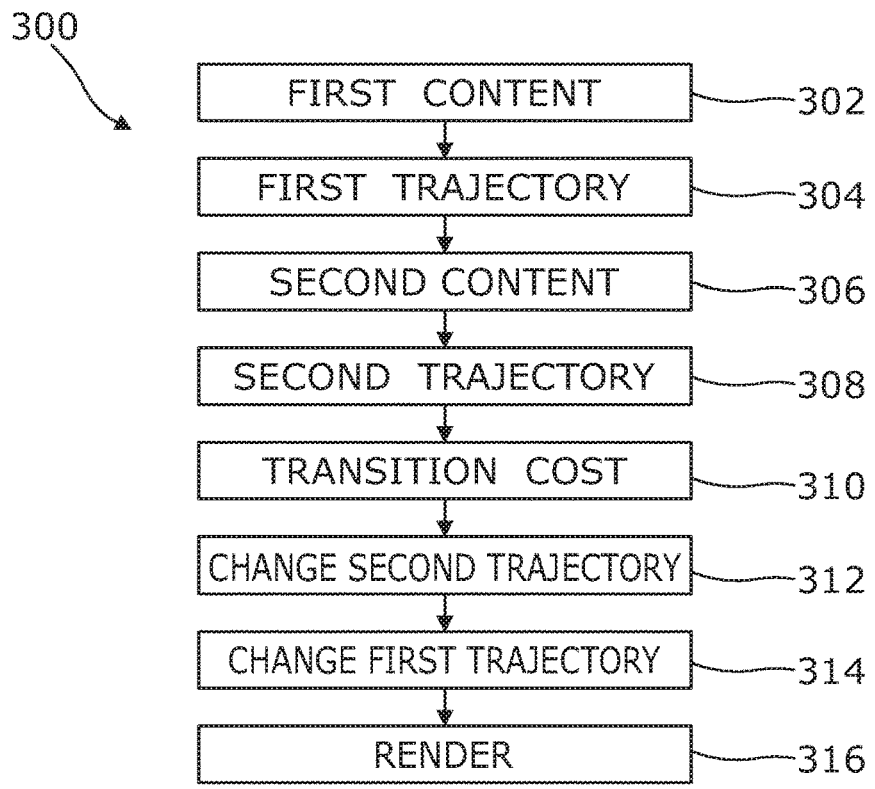
Figure 10:
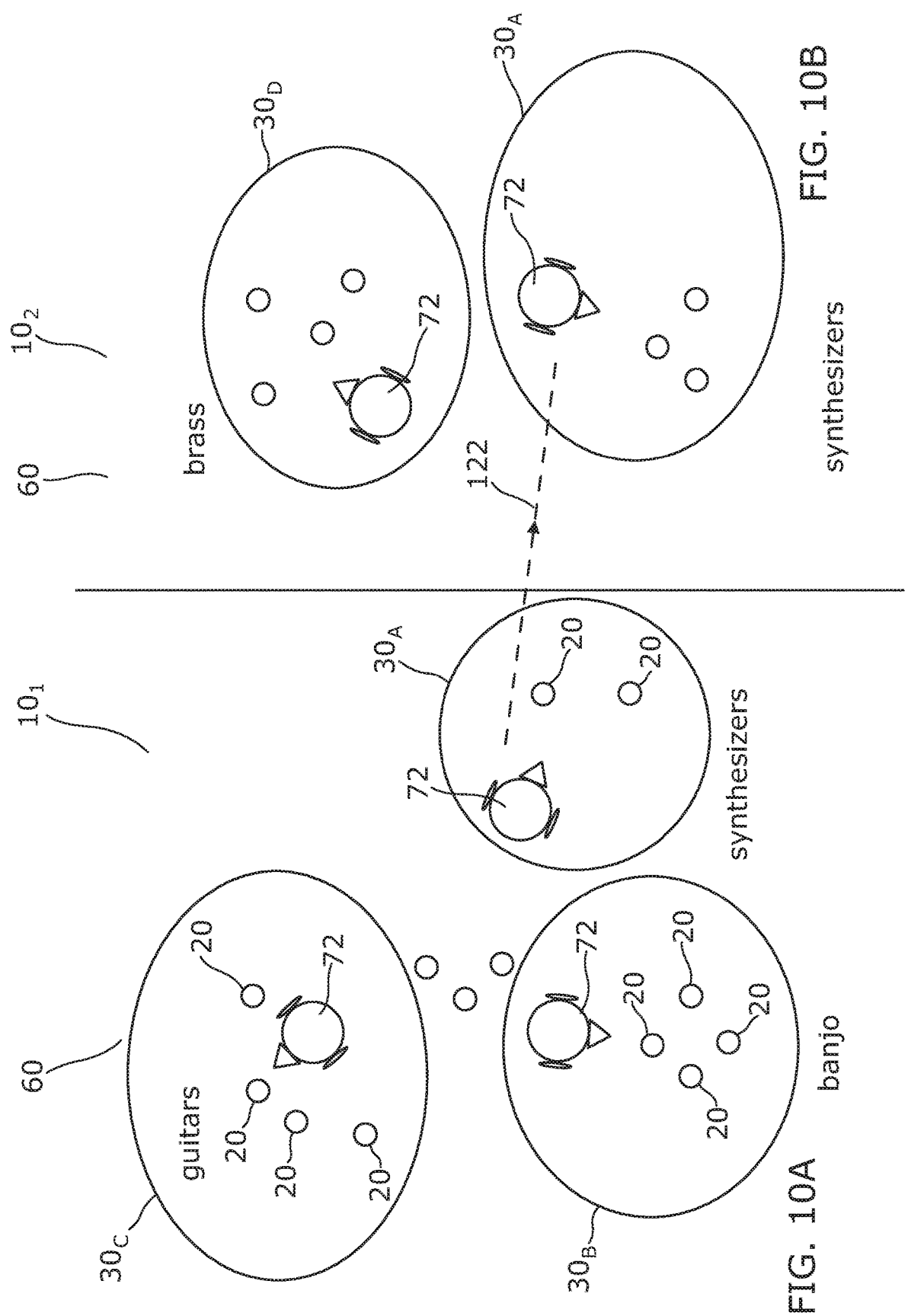
Figure 11:
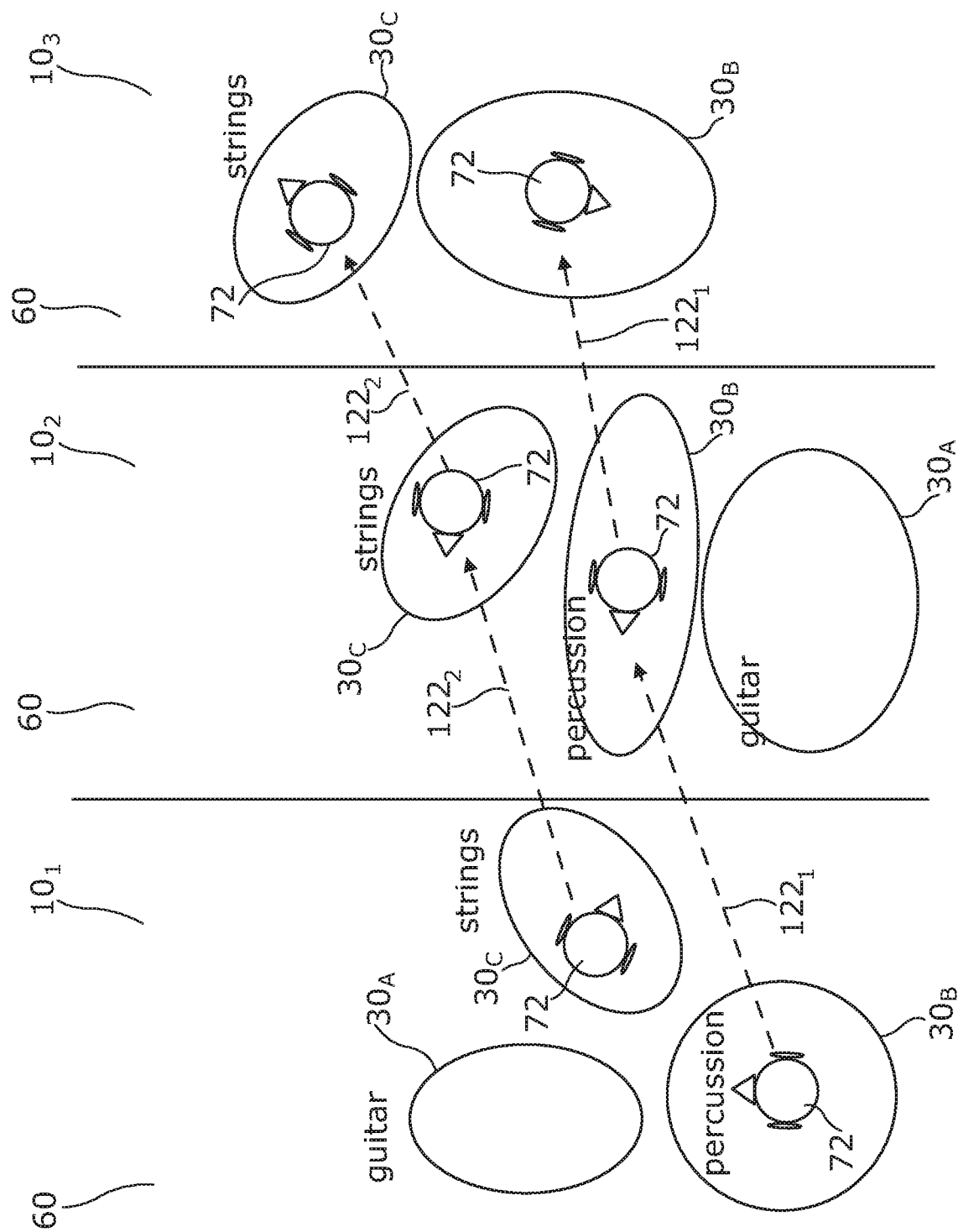
Figure 12:
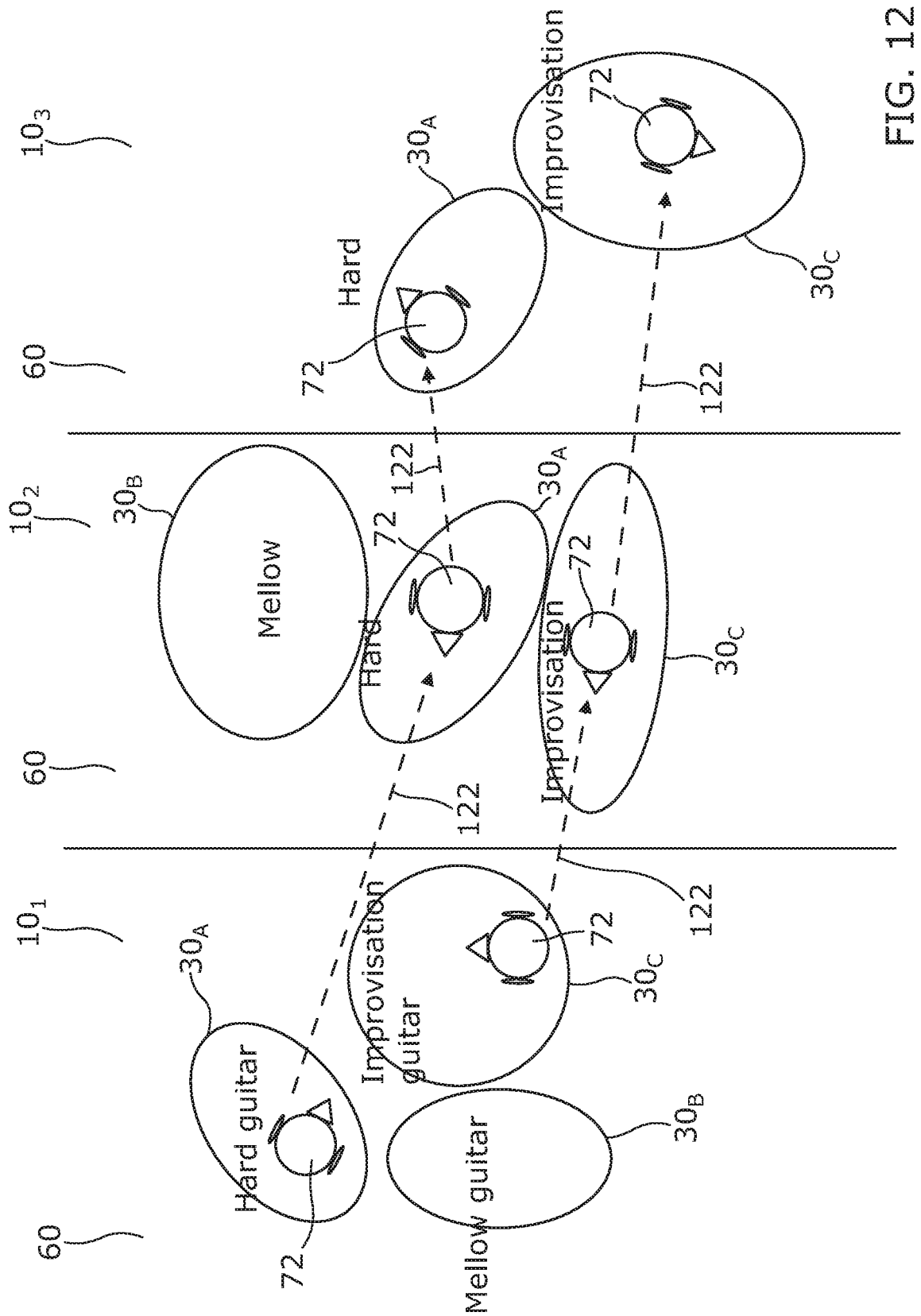
Figure 13:
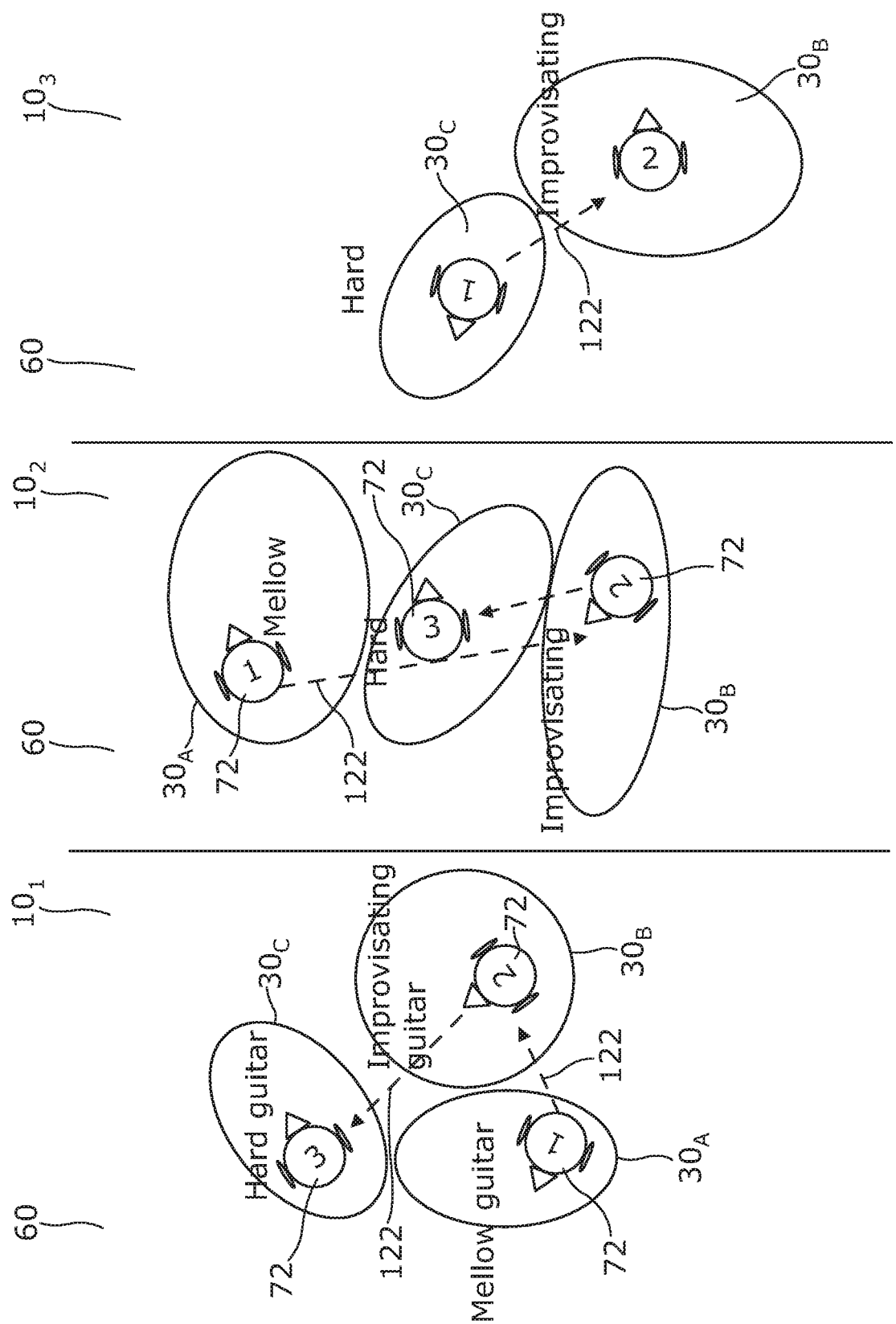
Figure 14:
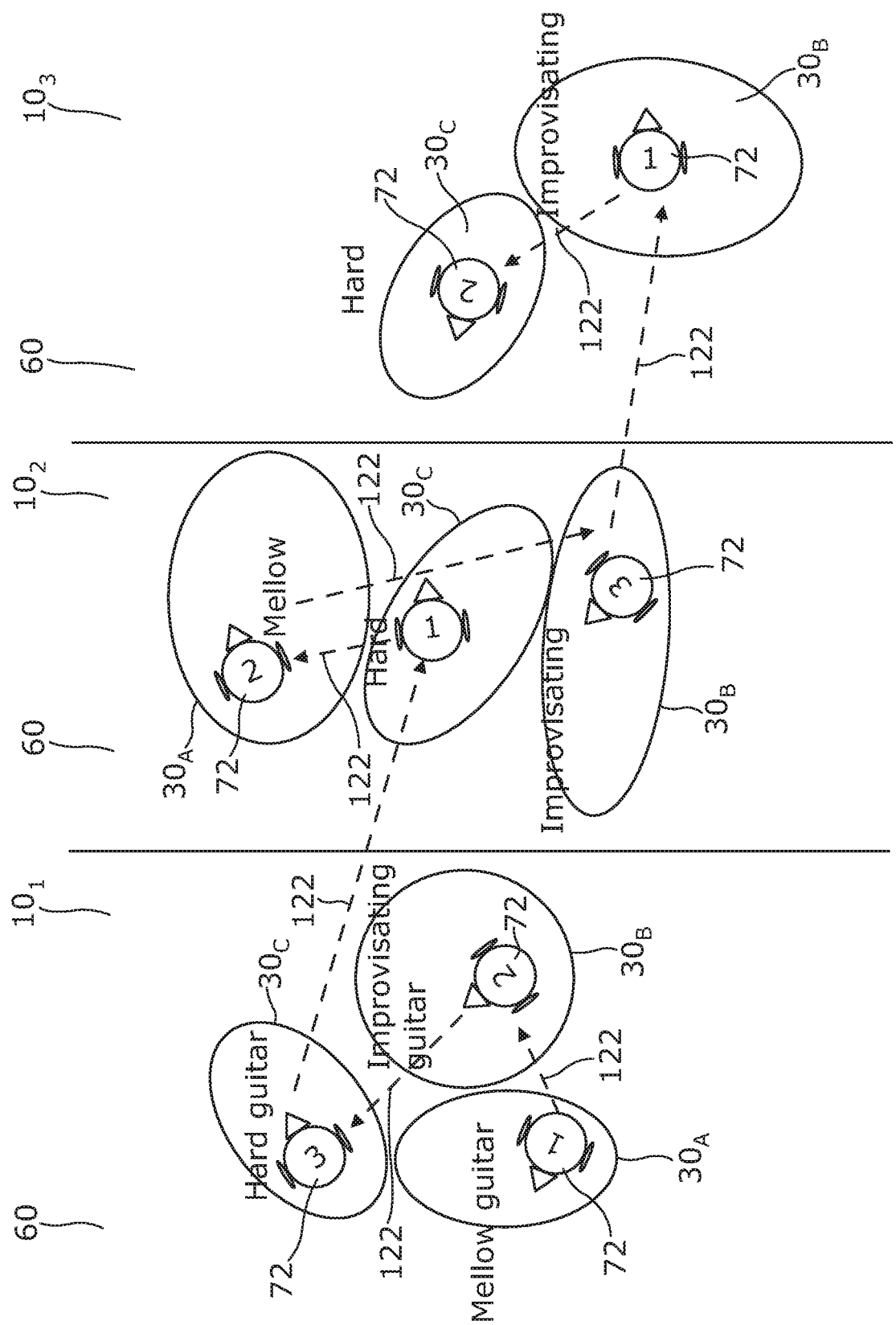
Figure 15:
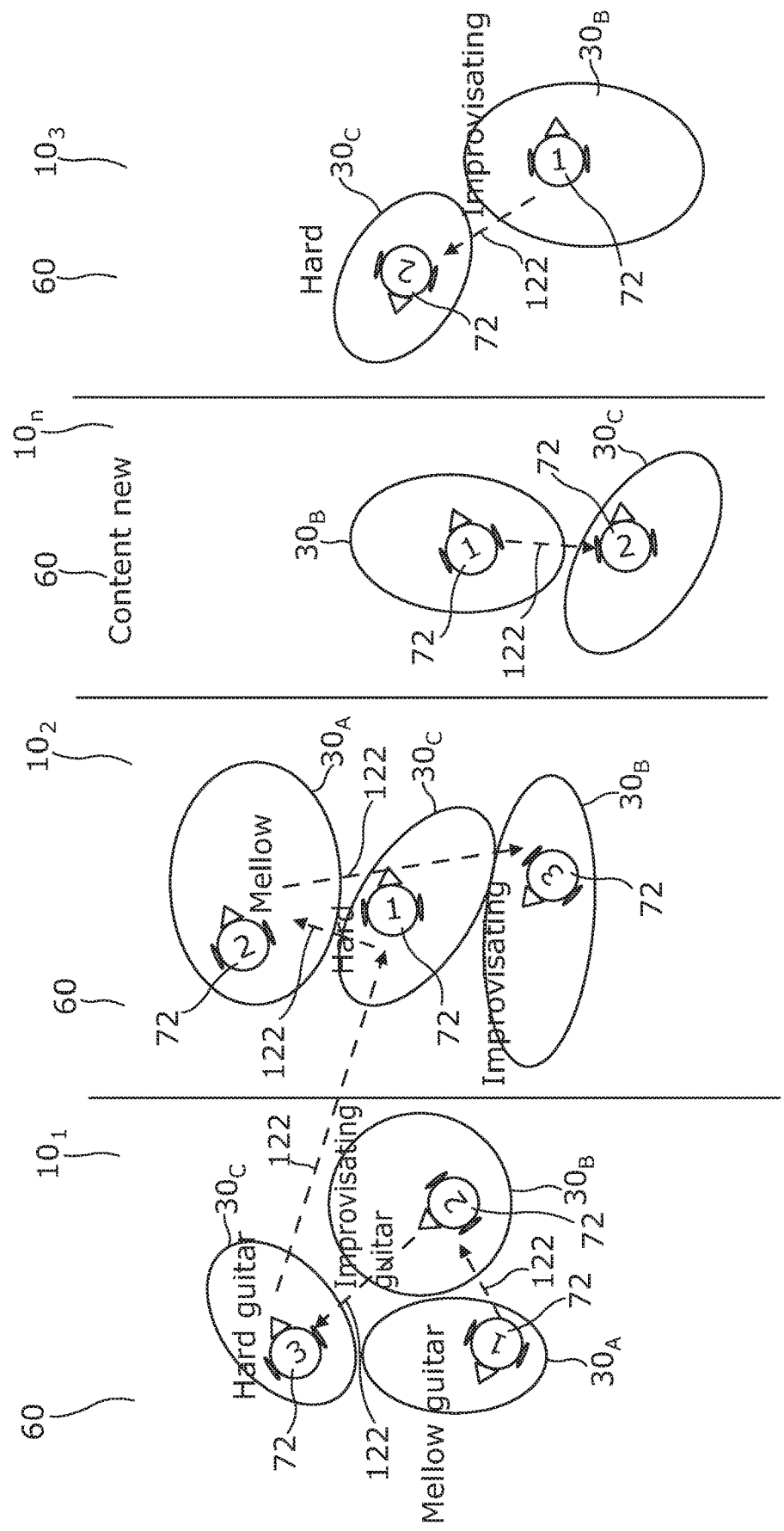
Figure 16:
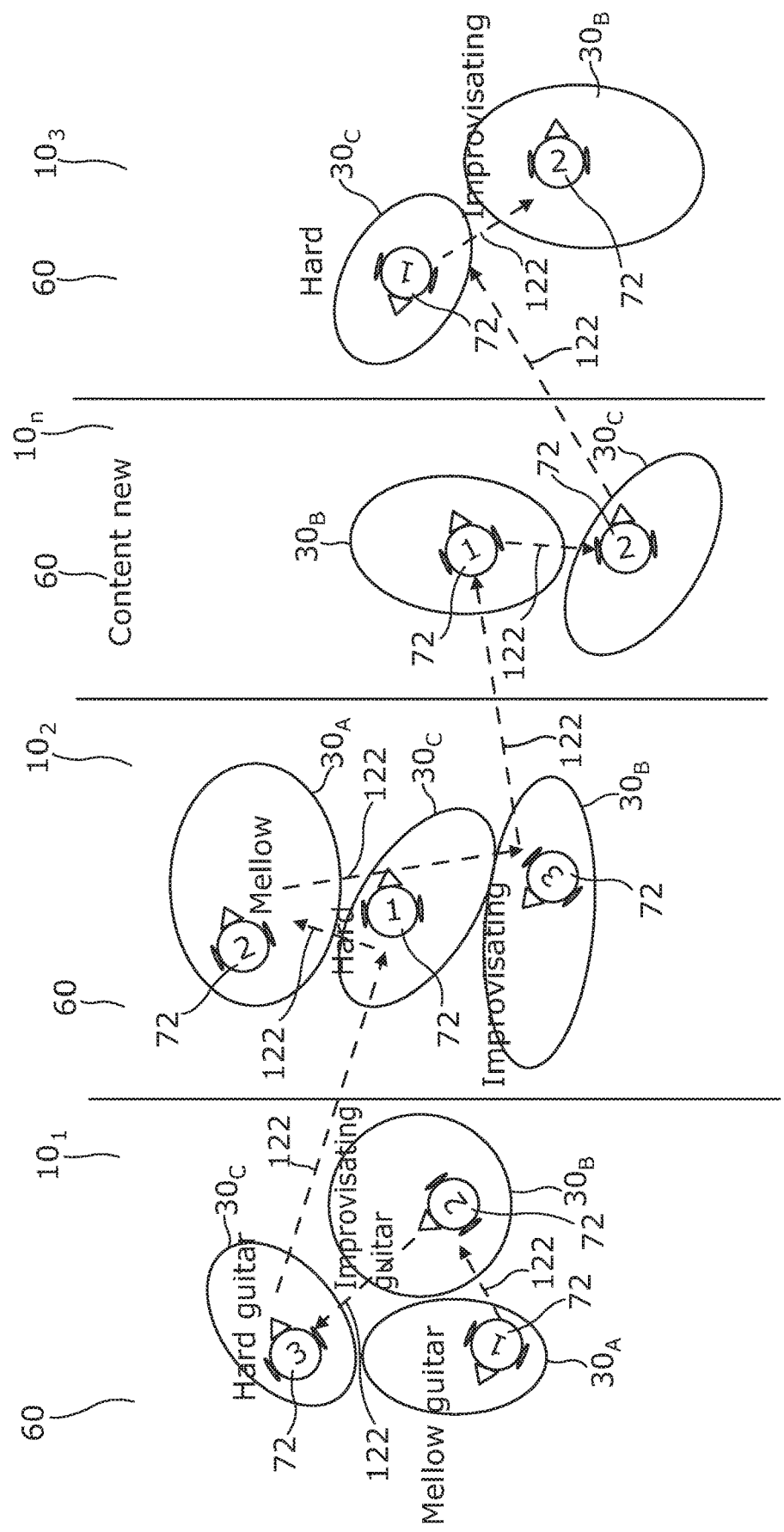
Figure 17:
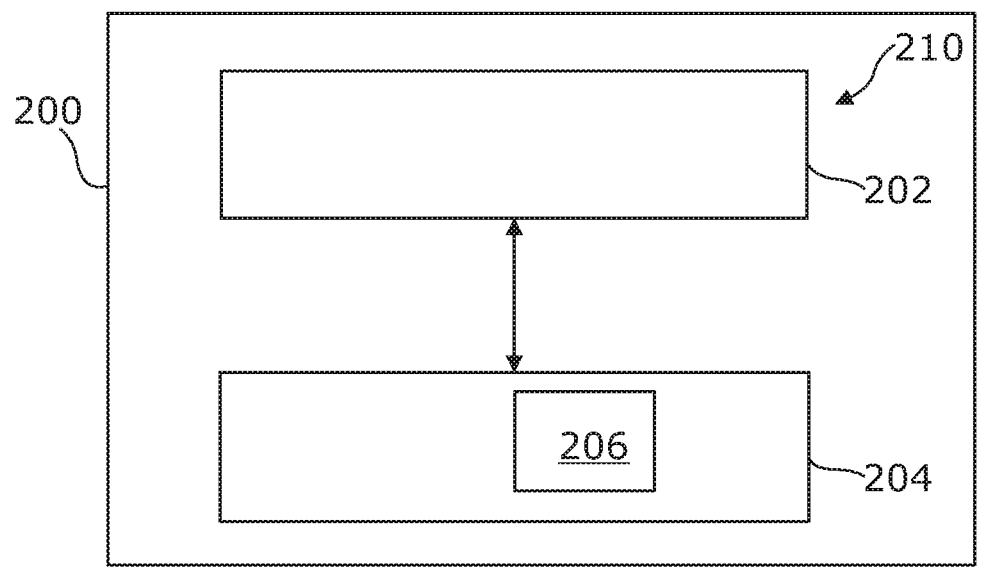
Figure 18:
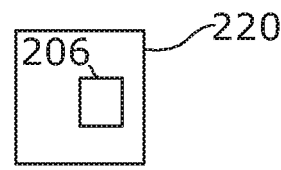
Figure 19:
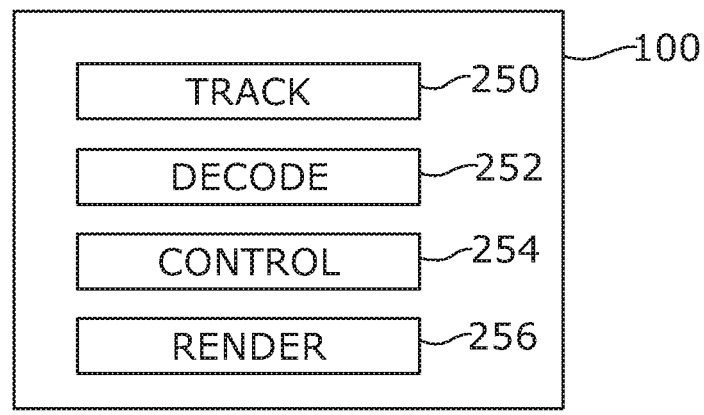

Some example embodiments will now be described with reference to the accompanying drawings in which:
FIG. 1A, 1B, 1C, 1D show example embodiments of the subject matter described herein;
FIG. 2 shows another example embodiment of the subject matter described herein;
FIG. 3 shows another example embodiment of the subject matter described herein;
FIG. 4 shows another example embodiment of the subject matter described herein;
FIG. 5 shows another example embodiment of the subject matter described herein;
FIG. 6 shows another example embodiment of the subject matter described herein;
FIG. 7 shows another example embodiment of the subject matter described herein;
FIG. 8A shows another example embodiment of the subject matter described herein;
FIG. 8B shows another example embodiment of the subject matter described herein;
FIG. 9 shows another example embodiment of the subject matter described herein;
FIGS. 10A and 10B show another example embodiment of the subject matter described herein;
FIG. 11 shows another example embodiment of the subject matter described herein;
FIG. 12 shows another example embodiment of the subject matter described herein;
FIG. 13 shows another example embodiment of the subject matter described herein;
FIG. 14 shows another example embodiment of the subject matter described herein;
FIG. 15 shows another example embodiment of the subject matter described herein;
FIG. 16 shows another example embodiment of the subject matter described herein;
FIG. 17 shows another example embodiment of the subject matter described herein;
FIG. 18 shows another example embodiment of the subject matter described herein;
FIG. 19 shows another example embodiment of the subject matter described herein;

DEFINITIONS

"artificial environment" may be something that has been recorded or generated.

"virtual visual space" refers to a fully or partially artificial environment that may be viewed, which may be three-dimensional.

"virtual visual scene" refers to a representation of the virtual visual space viewed from a particular point-of-view (position) within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point-of-view (position) within the sound space.

"sound object" refers to a sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an augmented virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point-of-view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point-of-view defines the sound scene and a notional (virtual) viewer whose point-of-view defines the virtual visual scene (or visual scene) are at the same location and orientation, that is they have the same point-of-view (same virtual position).

"real space" (or "physical space") refers to a real environment, which may be three-dimensional.

"real scene" refers to a representation of the real space from a particular point-of-view (position) within the real space.

"real visual scene" refers to a visual representation of the real space viewed from a particular real point-of-view (position) within the real space.

"mediated reality" in this document refers to a user experiencing, for example visually and/or aurally, a fully or partially artificial environment (a virtual space) as a virtual scene at least partially rendered by an apparatus to a user. The virtual scene is determined by a point-of-view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality.

"virtual reality" in this document refers to a form of mediated reality in which a user experiences a fully artificial environment (a virtual visual space) as a virtual scene displayed by an apparatus to a user.

"virtual content" is content, additional to real content from a real scene, if any, that enables mediated reality by, for example, providing one or more augmented virtual objects.

"mediated reality content" is virtual content which enables a user to experience, for example visually and/or aurally, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually and/or aurally, a partially artificial environment (a virtual space) as a virtual scene. Augmented reality content could include interactive content such as a video game or non-interactive content such as motion video.

"virtual reality content" is a form of mediated reality content which enables a user to experience, for example visually and/or aurally, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point-of-view (virtual position) within the virtual space, changing the virtual scene.

"first person perspective-mediated" as applied to mediated reality, augmented reality or virtual reality means perspective-mediated with the additional constraint that the user's real point-of-view (location and/or orientation) determines the point-of-view (virtual position) within the virtual space of a virtual user.

"third person perspective-mediated" as applied to mediated reality, augmented reality or virtual reality means perspective-mediated with the additional constraint that the user's real point-of-view does not determine the point-of-view (virtual position) within the virtual space.

"user interactive" as applied to mediated reality, augmented reality or virtual reality means that user actions at least partially determine what happens within the virtual space.

"displaying" means providing in a form that is perceived visually (viewed) by the user.

"rendering" means providing in a form that is perceived by the user.

"virtual user" defines the point-of-view (virtual position—location and/or orientation) in virtual space used to generate a perspective-mediated sound scene and/or visual scene. A virtual user may be a notional listener and/or a notional viewer.

"notional listener" defines the point-of-view (virtual position—location and/or orientation) in virtual space used to generate a perspective-mediated sound scene, irrespective of whether or not a user is actually listening.

"notional viewer" defines the point-of-view (virtual position—location and/or orientation) in virtual space used to generate a perspective-mediated visual scene, irrespective of whether or not a user is actually viewing.

Three degrees of freedom (3DoF) describes mediated reality where the virtual position is determined by orientation only (e.g. the three degrees of three-dimensional orientation). An example of three degrees of three-dimensional orientation is pitch, roll and yaw. In relation to first person perspective-mediated reality 3DoF, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). An example of three degrees of three-dimensional orientation is pitch, roll and yaw. An example of three degrees of three-dimensional location is a three-dimensional coordinate in a Euclidian space spanned by orthogonal axes such as left to right (x), front to back (y) and down to up (z) axes. In relation to first person perspective-mediated reality 6DoF, both the user's orientation and the user's location in the real space determine the virtual position. In relation to third person perspective-mediated reality 6DoF, the user's location in the real space does not determine the virtual position. The user's orientation in the real space may or may not determine the virtual position.

Three degrees of freedom 'plus' (3DoF+) describes an example of six degrees of freedom where a change in location (e.g. the three degrees of three-dimensional location) is a change in location relative to the user that can arise from a postural change of a user's head and/or body and does not involve a translation of the user through real space by, for example, walking.

"spatial audio" is the rendering of a sound scene. "First person perspective spatial audio" or "immersive audio" is spatial audio where the user's point-of-view determines the sound scene so that audio content selected by a current point-of-view of the user is rendered to the user.

DETAILED DESCRIPTION

FIGS. 1A, 1B, 1C, 1D, illustrate first person perspective mediated reality. In this context, mediated reality means the rendering of mediated reality for the purposes of achieving mediated reality for a remote user, for example augmented reality or virtual reality. It may or may not be user interactive. The mediated reality may support one or more of: 3DoF, 3DoF+ or 6DoF.

Figure 1C:
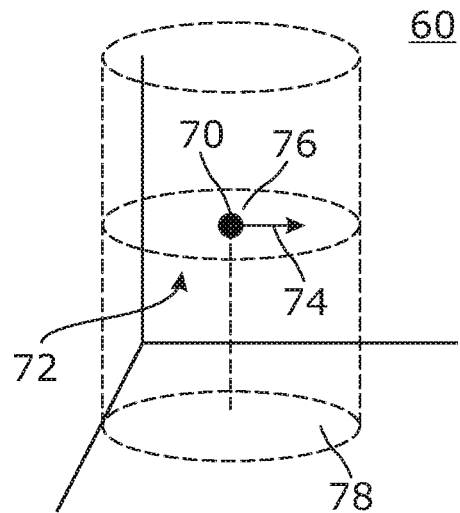

FIGS. 1A, 1C illustrate at a first time a real space 50 and a sound space 60. A user 40 in the real space 50 has a point-of-view (a position) 42 defined by a location 46 and an orientation 44. The location is a three-dimensional location and the orientation is a three-dimensional orientation.

In an example of 3DoF mediated reality, the user's real point-of-view 42 (orientation) determines the point-of-view 72 (virtual position) within the virtual space (e.g. sound space 60) of a virtual user 70. An orientation 44 of the user 40 controls a virtual orientation 74 of a virtual user 70. There is a correspondence between the orientation 44 and the virtual orientation 74 such that a change in the orientation 44 produces the same change in the virtual orientation 74. In 3DoF mediated reality, a change in the location 46 of the user 40 does not change the virtual location 76 or virtual orientation 74 of the virtual user 70.

The virtual orientation 74 of the virtual user 70 in combination with a virtual field of hearing defines a virtual sound scene 78. A virtual sound scene 78 is that part of the sound space 60 that is rendered to a user.

In the example of 6DoF mediated reality, the user's real point-of-view 42 (location 46 and/or orientation 44) determines the point-of-view 72 (virtual position) within the virtual space (e.g. sound space 60) of a virtual user 70. The situation is as described for 3DoF and in addition it is possible to change the rendered virtual sound scene 78 by movement of a location 46 of the user 40. For example, there may be a mapping between the location 46 of the user 40 and the virtual location 76 of the virtual user 70. A change in the location 46 of the user 40 produces a corresponding change in the virtual location 76 of the virtual user 70. A change in the virtual location 76 of the virtual user 70 changes the rendered virtual sound scene 78.

Figure 1B:
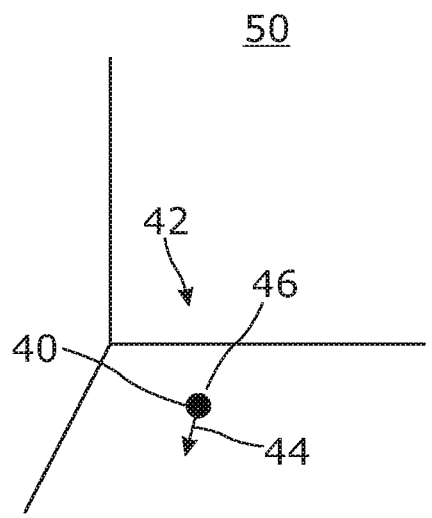
Figure 1D:
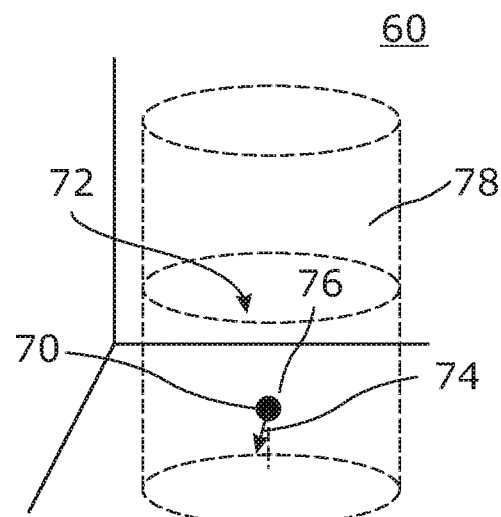

This may be appreciated from FIGS. 1B, 1D which illustrate the consequences of a change in location 46 and orientation 44 of the user 40 on the rendered virtual sound scene 78 (FIG. 1D). The change in location may arise from a postural change of the user and/or a translation of the user by walking or otherwise.

First person perspective-mediated reality may control only a virtual sound scene 78, a virtual visual scene and both a virtual sound scene 78 and virtual visual scene, depending upon implementation.

In some situations, for example when the virtual sound scene 78 is rendered to a listener through a head-mounted audio output device, for example headphones using binaural audio coding, it may be desirable for the rendered sound space 60 to remain fixed in real space when the listener turns their head in space. This means that the rendered sound space 60 needs to be rotated relative to the audio output device by the same amount in the opposite sense to the head rotation. The orientation of the portion of the rendered sound space tracks with the rotation of the listener's head so that the orientation of the rendered sound space remains fixed in space and does not move with the listener's head.

A sound 'locked' to the real world may be referred to as a diegetic sound.

A sound 'locked' to the user's head may be referred to as a non-diegetic sound.

The rendering of a virtual sound scene 78 may also be described as providing spatial audio or providing immersive audio.

As illustrated in FIG. 2, in at least some examples, the sound space 60 defined by spatial audio content 10 comprises one or more sound sources 20 at different positions in the sound space 60. The audio rendered to the user depends upon the relative position of the virtual user 70 from the positions of the sound sources 20. Perspective-mediated virtual reality, for example first person perspective-mediated reality enables the user 40 to change the position of the virtual user 70 within the sound space 60 thereby changing the positions of the sound sources 20 relative to the virtual user which changes the virtual sound scene 78 rendered to the user 40.

Channel-based audio, for example, n.m surround sound (e.g. 5.1, 7.1 or 22.2 surround sound) or binaural audio, can be used or scene-based audio, including spatial information about a sound field and sound sources, can be used.

Audio content may encode spatial audio as audio objects. Examples include but are not limited to MPEG-4 and MPEG SAOC. MPEG SAOC is an example of metadata-assisted spatial audio.

Audio content may encode spatial audio as audio objects in the form of moving virtual loudspeakers.

Audio content may encode spatial audio as audio signals with parametric side information or metadata. The audio signals can be, for example, First Order Ambisonics (FOA) or its special case B-format, Higher Order Ambisonics (HOA) signals or mid-side stereo. For such audio signals, synthesis which utilizes the audio signals and the parametric metadata is used to synthesize the audio scene so that a desired spatial perception is created.

The parametric metadata may be produced by different techniques. For example, Nokia's spatial audio capture (OZO Audio) or Directional Audio Coding (DirAC) can be used. Both capture a sound field and represent it using parametric metadata. The parametric metadata may for example comprise: direction parameters that indicate direction per frequency band; distance parameters that indicate distance per frequency band; energy-split parameters that indicate diffuse-to-total energy ratio per frequency band. Each time-frequency tile may be treated as a sound source with the direction parameter controlling vector based amplitude panning for a direct version and the energy-split parameter controlling differential gain for an indirect (decorrelated) version. In some embodiments, the parametric audio metadata may relate to a metadata-assisted spatial audio (MASA) format.

The audio content encoded may be speech and/or music and/or generic audio. 3GPP IVAS (3GPP, Immersive Voice and Audio services) and MPEG-I, which are currently under development, are expected to support new immersive voice and audio services, for example, mediated reality.

In some but not necessarily all examples amplitude panning techniques may be used to create or position a sound object. For example, the known method of vector-based amplitude panning (VBAP) can be used to position a sound source.

A sound object may be re-positioned by mixing a direct form of the object (an attenuated and directionally-filtered direct sound) with an indirect form of the object (e.g. positioned directional early reflections and/or diffuse reverberant). A sound source appears closer if it is louder and less reverberant and appears further away if it is quieter and more reverberant.

FIG. 2 illustrates an example of a sound space 60 comprising a plurality of sound sources 20 at different locations within the sound space 60. Each sound source 20 has associated with it a sound field 22, which may be a bearing, an area or a volume. When the virtual user 70 is aligned with or is within the sound field 22, then the user 40 has a different experience of the sound source 20 than if they are outside the sound field 22. In some examples, the user 40 may only hear the sound source 20 when the virtual user 70 is within the sound field 22 and cannot hear the sound source 20 outside the sound field 22. In other examples, the sound source 20 can be best heard within the sound field 22 and the sound source 20 is attenuated outside of the sound field 22 and in some examples, it is more attenuated the greater the deviation or distance from the sound field 22.

The sound sources 20 and their locations and other characteristics of the sound space 60 are defined by the spatial audio content 10. It will therefore be understood that the user 40, who is represented by the virtual user 70 in the sound space 60, experiences immersive audio. A portion of the spatial audio content 10 is selected by a current point-of-view 42 of the user 40 (point-of-view 72 of the virtual user 70). That portion of the spatial audio content 10 is rendered to the user 40.

The user 40, by changing their own point-of-view 42, can change the point-of-view 72 of the virtual user 70 to appreciate different aspects of the sound space 60. In some examples, the change in the point-of-view 42 of the user 40 is achieved by varying only the user's orientation 44 and in other examples it is achieved by changing the user's orientation 44 and/or the user's location 46. The spatial audio content 10 can therefore support 3DoF, 3DoF+, and 6DoF.

In this example, the sound space 60 comprises a number of distinct zones 30. Each of the zones 30 is fully or partially isolated from the other zones or at least some of the other zones. Isolation in this context means that if the user is located within a particular zone 30, then the immersive audio that they experience is dominated by the sound sources of that zone. In some examples they may only hear the sound sources of that zone. In other examples they may not hear the sound sources of some or all of the other zones. Even in the circumstances where the virtual user 70 is within a zone 30 it is likely that the sound sources of that zone will be dominant compared to the sound sources of any other zone 30.

The user 40 can change their point-of-view 42, to cause a consequent change in the point-of-view 72 of the virtual user 70 within a zone 30. This allows the user 40 to appreciate different aspects of the composition formed by the different sound sources 20 within the zone 30. As previously described, the change of point-of-view 72 within a zone may be achieved by 3DoF, 3DoF+, 6DoF. In at least some examples, there are one or more sweet spots in a zone 30. A sweet spot is a particular point-of-view 72 for a virtual user 70 at which a better composition of the sound sources 20 in the zone 30 is rendered. The composition is a mixed balance of the sound sources 20 of the zone 30.

The virtual user 70 can, depending upon implementation, emphasize a sound source 20 in the rendering of the sound scene by, for example, doing one or more of:
(i) moving towards the sound source 20
(ii) turning towards the sound source 20;
(iii) moving into the sound field 22 of a sound source 20

The virtual user 70 can, depending upon implementation, de-emphasize a sound source 20 in the rendering of the sound scene by, for example doing one or more of:
(i) moving away from the sound source 20
(ii) turning away from the sound source 20;
(iii) moving out of the sound field 22 of a sound source 20

It is also possible for the virtual user 70 to move between the different zones 30. The user 40 is able to control the location of the virtual user 70 within the sound space 60.

It will therefore be appreciated that, in general, the virtual user 70 by changing their location and/or orientation with respect to the sound source 20 can control how the sound source 20 is rendered to the user 40. The point-of-view of the user 40 controls the point-of-view of the virtual user 70.

In the particular example illustrated, but not necessarily all examples, the sound sources 20 of the sound space 60 are musical instruments. Each of the zones 30 has a main instrument and none, or one or more complementing instruments. The main instrument is represented by a sound source 20. Each of the complementing instruments, if present, is represented by a distinct sound source 20. The secondary instruments of a zone 30 complement the primary instrument of the zone 30.

A sound source 20 can be a positioned sound source that originated from a particular location or can be an ambient sound source that does not appear to originate from a particular position.

A positioned sound source is associated with a particular position. If a virtual user point-of-view 72 satisfies a proximity criterion associated with that position, then that sound source is rendered from the particular position. If a virtual user point-of-view 72 does not satisfy the proximity criterion associated with that position, then that sound source is not rendered from the particular position or otherwise. The gain/attenuation used for the sound source (and possibly the reverberation) can be based on a distance of the user point-of-view from the particular position.

A zoned, ambient sound source (an anchor sound) is associated with a plurality of positions. If a virtual user point-of-view 72 satisfies a proximity criterion associated with one of those positions (the particular position), then that sound source is rendered but not from the particular position but as an ambient sound source. If a virtual user point-of-view 72 does not satisfy the proximity criterion associated with any one of those positions, then that sound source is not rendered. The gain/attenuation used for the sound source (and possibly the reverberation) can be based on a distance of the user point-of-view from the particular position and also the gain/attenuation of any positioned sound sources being rendered. These anchor sound may be used to provide ambient sounds locally at multiple zones.

Thus, an anchor sound is audible throughout a sound space on a zone-by-zone basis. If the drum and bass of a central zone are anchor sounds, then when the user leaves from the central zone, the distance/gain attenuation first attenuates the drum and bass. As the user approaches a zone with certain instruments, the instrument levels start to increase. When the instrument levels have increased to a certain amount, the drum and bass start to increase again in level so that they are audible along with the approached instruments. This ensures that the anchor sounds are audible at different zones but without obscuring an understanding of the sound space. Virtual position anchors are defined for the anchor sounds. There may be a single virtual position at each zone for all the anchor sounds, or each anchor sound might have its own virtual position in each zone. Some zones may not have virtual position anchors at all if it is not desirable to render anchor sounds there at suitable volume level. The gain of an anchor sound source is maximal closest to a real position of an anchor sound or the virtual position of an anchor sound. The gain to be applied in rendering is determined based on the closest distance to a real position or virtual position. The virtual position does not have an effect on the rendered direction-of-arrival of the anchor sounds; it only affects the distance-gain attenuation.

There may, for example, be none, one or more anchor sound per zone and one or more positioned sound sources.

Metadata can be used to define the characteristics of sound sources 20 and control rendering behaviour.

FIG. 3 is an example of zonal spatial audio content 10 similar to spatial audio content 10 illustrated in FIG. 2 but at a higher obstruction level, highlighting the delineation of the different zones 30. In this example, zone 1 is isolated from zones 2, 3 and 4 but not from the zone associated with the baseline instruments. Likewise, zone 2 is isolated from zones 1, 3 and 4 but not from the zone associated with the baseline instruments. Likewise, zone 4 is isolated from zones 1, 2 and 3 but not from the zone associated with the baseline instruments. Likewise, zone 3 is isolated from zones 1, 2 and 4 but not from the zone associated with the baseline instruments. As a consequence, when the virtual user 70 is in zone 1 the sound scene rendered to the user 40 is primarily dependent upon the sound sources 20 of zone 1 and the point-of-view of the virtual user 70 within zone 1 but may also include at a secondary level, sound sources from the zone associated with the baseline instruments. When the virtual user 70 is in zone 2 the sound scene rendered to the user 40 is primarily dependent upon the sound sources 20 of zone 2 and the point-of-view of the virtual user 70 within zone 2 but may also include at a secondary level, sound sources from the zone associated with the baseline instruments (anchor sounds).

Thus, the baseline instruments may be heard in all zones as anchor sounds. The sound sources of the other zones can only be heard if the virtual user 70 is within that particular zone 30.

It will be seen that there are gaps between the various different zones 30. In some examples, in these gaps only the baseline instruments can be heard. In other examples no sound sources can be heard.

FIG. 4 illustrates an example of an apparatus 100 for rendering spatial audio content 10 to a user 40 using different modes.

In this example, the apparatus 100 comprises:
i) a mode control module 102 configured to switch the apparatus 100 between a first mode and a second mode;
ii) a content module 104 configured to provide spatial audio content 10 to a selection module 108;
iii) a point-of-view module 106 configured to provide points-of-view to the selection module 108;
iv) a selection module 108 configured to use the provided point-of-view from the point-of-view module 106 to select a sound scene from the spatial audio content 10. This selection is performed in accordance with first person perspective-mediated reality as previously described.
v) a rendering module 110 configured to render the selected sound scene to a user 40.

In a first mode, the rendering module 110 renders the sound scenes defined by a spatial audio content 10 to a user. The current sound scene is selected by a current point-of-view of the user. Thus, the measured real-time point-of-view of the user is used to select the real-time sound scene.

In a second mode, a decision module 114 uses the spatial audio content 10 to automatically determine, at least in part, a sequence of notional points-of-view of the user. A sequence of sound scenes is selected, at the selection module 108, by the sequence of notional points-of-view of the user. The rendering module 110 renders the sequence of sound scenes.

A sound scene is selected by a current or notional point-of-view of the user using first person-perspective mediated reality. That is the point-of-view of the user determines a point-of-view within a virtual space of a virtual listener whose point-of-view defines the sound scene.

Despite the same spatial audio content 10 potentially being used in the first mode or the second mode, in the first mode a measured real-time point-of-view of the user is used to select the real-time sound scene. However, in the second mode the measured real-time point-of-view of the user is not used to select the real-time sound scene. Instead the automatically determined sequence of notional points-of-view of the user is used to select a sequence of sound scenes rendered.

Each of the modules illustrated in FIG. 4 may be dedicated circuitry or may be general circuitry that is programmed to perform a specific function, for example a programmable processor. Different circuitry may be used for each module or the same circuitry may be used for one, multiple or all of the modules.

Although FIG. 4 illustrates an apparatus 100, in other examples it may be implemented as a distributed system. In this case, each module is physically separated from one or more of the other modules with which it communicates. The communication may, for example, be via one or more wireless channels.

FIG. 5 illustrates an example of a sequence 120 of notional points-of-view $72_i$ of the virtual user 70 generated for the second mode. The sequence 120 forms a trajectory 122 through the sound space 60. The sequence 120 of notional points-of-view $72_i$ of the virtual user 70 are provided by the point-of-view module 106 to the selection module 108. The sequence of virtual sound scenes 78 rendered by the rendering module 110 are selected by the selection module 108 based on that sequence 120 of notional points-of-view $72_i$ of the virtual user 70.

Consequently, FIG. 4 illustrates an example of an apparatus 100 comprising means for:
in a first mode rendering virtual sound scenes 78 defined by a spatial audio content 10 to a user 40, wherein a current virtual sound scene 78 is selected by a current point-of-view 72 of the virtual user 70; and
in a second mode, automatically determining, at least in part, a sequence 120 of notional points-of-view $72_i$ of the user in dependence upon the spatial audio content 10; and rendering the virtual sound scenes 78 defined by the spatial audio content 10 to a user 40 as a sequence of the virtual sound scenes 78 selected by the sequence 120 of notional points-of-view 72$_i$ of the virtual user 70.

The notional points-of-view 72$_i$ are listening points and may, for example, be sweet spots. The spatial audio content 10 may comprise one or more content items, for example music tracks or other separable objects. The trajectory 122 may be within a single content item or may alternatively or additionally be between content items.

It will be appreciated from the description above, that the amount of information that is sent by the selection module 108 to the rendering module 110 is substantially less than the amount of information received by the selection module 108 from the content module 104. This can be particularly useful if the channel between the selection module 108 and the rendering module 110 is a shared communication channel or a communication channel of limited bandwidth.

FIG. 6 illustrates an example of a method 230 for rendering spatial audio content 10. This method 230 is the method performed by the apparatus 100. The method 230 comprises a first block 232 and a second block 234. The first block 232 is performed in a first mode and the second block 234 is performed in a second mode.

At block 232, the method 230 comprises rendering virtual sound scenes 78 defined by a spatial audio content 10 to a user, wherein a current virtual sound scene 78 is selected by a current point-of-view 72 of the virtual user 70.

At block 234, the method 230 comprises: automatically determining, at least in part, a sequence 120 of notional points-of-view 72$_i$ of the user in dependence upon the spatial audio content 10, and rendering virtual sound scenes 78$_i$ defined by the spatial audio content 10 to a user, wherein a sequence of virtual sound scenes 78$_i$ is selected by the sequence 120 of notional points-of-view 72$_i$ of the user.

The method 230 also illustrates the step of switching 233 from the first mode to the second mode. This switch occurs when the user wishes to experience spatial audio content 10 but it is not possible for the user to be fully immersed within that spatial audio content 10 (first mode). This limitation may, for example, arise because of context or because of limitations of the apparatus 100 or the rendering module 110. The mode change to the second mode, reduces the number of degrees of freedom a user has in controlling rendering of the spatial audio content 10.

For example, the first mode may be a 6DoF mode in which spatial audio content is rendered based on tracking orientation and location. The second mode may be a 0DoF mode (this does not require orientation tracking nor does it require location tracking), a 3DoF mode (this requires orientation tracking but does not require location tracking), or a 3DoF+ mode (this requires orientation tracking and some limited location tracking but not generally translation tracking).

In another example, the first mode may be a 3DoF+ mode in which spatial audio content is rendered based on tracking orientation and location to a limited extent. The second mode may be a 0DoF mode (this does not require orientation tracking nor does it require location tracking) or a 3DoF mode (this requires orientation tracking but does not require location tracking).

In another example, the first mode may be a 3DoF mode in which spatial audio content is rendered based on tracking orientation only. The second mode may be a 0DoF mode (this does not require orientation tracking nor does it require location tracking).

The switching 233 from the first mode to the second mode may, for example, occur in dependence upon one or more of:

a) a user input (allowing a user to choose to switch from the first mode to the second mode), or
b) determining that it is likely that full (or partial) immersion in the available spatial audio content is not possible.

This may, for example, occur because the real space around the user is limited and does not enable translational movement of the user so 6DoF is unavailable.

This may also occur when it is sensed that the user cannot or cannot easily or freely change location (6DoF not available) and/or change posture (3DoF+ not available) and/or change orientation (3DoF not available).

The switching 233 from the first mode to the second mode may, for example, therefore occur in dependence upon one or more of:
i) sensing a real space around the user,
ii) sensing a user's ability to change location and/or orientation,
iii) sensing whether a user is a particular posture (prone, sitting etc),
iv) sensing whether a user is performing a particular activity (driving, conversing etc),
v) sensing whether a user is moving themselves (walking, jogging, cycling etc).

The apparatus 100 will, in some examples, comprise sensors 116 for determining when to switch from the first mode to the second mode and/or for determining the dimensionality of the second mode (3DoF+, 3DoF or 0DoF).

For 6DoF spatial audio content 10, a point-of-view 72 is a combination of location and orientation. Using this spatial audio content 10, at block 234, to automatically determine, at least in part, a sequence 120 of notional points-of-view 72 of the virtual user 70 determines at least locations for the notional points-of-view of the user.

Where the 6DoF spatial audio content 10 is reduced to 3DoF in the second mode, a current point-of-view of the user determines a current orientation for the notional points-of-view 72 of the virtual user. In this circumstance, the user therefore has partial immersion in that part of the point-of-view that determines the rendered content is determined by the current orientation of the user, however, the location that determines the rendered content is automatically determined.

In another example, where the 6DoF spatial audio content 10 is reduced to 0DoF spatial audio content in the second mode, a current point-of-view of the user does not determine a current orientation for the notional points-of-view 72$_i$ of the user. Instead, the automatically determined notional points-of-view 72 of the virtual user 70 are entirely defined automatically.

It should be appreciated from the foregoing description, that the spatial audio content does not need to be of a particular type. It may, for example, be entertainment, news, art, music etc.

Referring back to FIG. 2, the zones 30 illustrated in FIG. 2 may relate to the same content item being rendered in different ways or may relate to different content items being rendered in the same way or in different ways. There may, for example, be a variation and/or similarity between zones as regards styles, instrumental use, language, commentators, difficulty levels or topics.

In some examples, the spatial audio content 10 is arranged as a playlist 140, for example, as illustrated in FIG. 7. The playlist 140 comprises an ordered sequence of spatial audio content items 10$_i$ that are rendered in order. Each spatial audio content item 10$_i$ enables rendering to the user 40 of one or more virtual sound scenes 78$_i$ defined by the spatial audio content item $10_i$ and selected by notional or current points-of-view 72 of the virtual user 70.

In the second mode, at block 234, the method 230 determines a first set of one or more notional points-of-view 72 of the virtual user 70 for this first spatial audio content item $10_1$. The selected one or more notional points-of-view of the virtual user from the determined first set of one or more notional points-of-view of the virtual user define a first trajectory $122_1$ of a virtual user through a first sound space 60. FIG. 8A illustrates an example of a first trajectory $122_1$ through a portion of the sound space 60 defined by the first spatial audio content item $10_1$. The first spatial audio content item $10_1$ defines a plurality of sound sources 20. The sound sources 20 may be positional sound sources and/or ambience sound sources. The method renders first virtual sound scenes 78 defined by the first spatial audio content item $10_1$ to the user, where the first virtual sound scenes 78 are selected by the notional points-of-view 72 of the virtual user 70 along the first trajectory $122_1$.

In the second mode, at block 234, the method 230 determines a second set of one or more notional points-of-view 72 of the virtual user 70 for the second spatial audio content item $10_2$. The selected one or more notional points-of-view of the user from the determined second set of one or more notional points-of-view of the user define a second trajectory $122_2$ of the virtual user through a second sound space. FIG. 8B illustrates an example of a second trajectory $122_2$ through a portion of the sound space 60 defined by the second spatial audio content item $10_2$. The second spatial audio content item $10_2$ defines a plurality of sound sources 20. The sound sources 20 may be positional sound sources and/or ambience sound sources. The method renders second virtual sound scenes 78 defined by the second spatial audio content item $10_2$ to the user, where the second virtual sound scenes 78 are selected by the notional points-of-view 72 of the virtual user 70 along the second trajectory $122_2$.

In some, but not necessarily all examples the first trajectory $122_1$ and/or the second trajectory $122_2$ can be varied during rendering. In some, but not necessarily all examples, a user input enables a user of the apparatus 100 to control varying the first trajectory $122_1$ and/or the second trajectory $122_2$ during rendering. In some, but not necessarily all examples, a user input enables a user of the apparatus 100 to control the playlist by adding, removing and/or reordering spatial audio content items $10_i$.

In some examples, the method 230 can enable the rendering of exactly the same content from different trajectories. In this example, the first spatial audio content item $10_1$ is the same as the second spatial audio content item $10_2$. The method varies the trajectory 122 within the same content in subsequent renderings of that same content. In the first rendering, as illustrated in FIG. 8A, a first trajectory $122_1$ is used and in a second subsequent rendering as illustrated in FIG. 8B, a second trajectory $122_2$ is used.

In other examples, the first spatial audio content item $10_1$ and the second spatial audio content item $10_2$ are different and the second spatial audio content item $10_2$ is rendered immediately after the first spatial audio content item $10_1$. In this example, the first trajectory $122_1$ may be dependent upon not only the first spatial audio content item $10_1$ but also dependent upon the second spatial audio content item $10_2$. Also, in this example, the second trajectory $122_2$ may be dependent upon not only the second spatial audio content item $10_2$ but also dependent upon the first spatial audio content item $10_1$. It may, for example, be desirable to achieve some form of matching between the first trajectory $122_1$ and the second trajectory $122_2$.

Referring back to FIG. 7, each of the spatial audio content items $10_i$ may be associated with metadata that is used to determine trajectories 122. In some but not necessarily all examples, the first trajectory $122_1$ and/or the second trajectory $122_2$ can be based on at least the metadata.

In some but not necessarily all examples, the meta data comprises at least a first parameter. The first trajectory $122_1$ and/or the second trajectory $122_2$ can be based on at least the first parameter.

For example, by maintaining similarity (matching) of the parameter across a transition between the first spatial audio content item $10_1$ and the second spatial audio content item $10_2$.

The metadata may, for example, record previous uses of a spatial audio content item $10_i$, and/or preferences for rendering spatial audio content items.

The metadata may, for example, be input by the user and/or defined by a content creator and/or generated from analyzing the spatial audio content item.

FIG. 9 illustrates an example of a method 300 for controlling the rendering of multiple spatial audio content items $10_i$.

The method comprises, at block 302, obtaining a first spatial audio content item $10_1$. The method comprises, at block 304, obtaining a sequence 120 of notional points-of-view 72 for the first spatial audio content item $10_1$. This is a putative definition of the first trajectory $122_1$.

The method at block 306, comprises obtaining a second spatial audio content item $10_2$. The method comprises, at block 308, obtaining a sequence 120 of notional points-of-view 72 of the virtual user 70 for the second spatial audio content item $10_2$. This defines a putative second trajectory $122_2$.

The method at block 310, comprises comparing a change on transitioning from the end of the first trajectory $122_1$ to the beginning of the second trajectory $122_2$. That is determining a 'cost' of changing from a last notional point-of-view 72 in the sequence 120 defining the first trajectory $122_1$ to the first notional point-of-view 72 in the sequence 120 defining the second trajectory $122_2$.

If the 'cost' is too large, then the method 300, at block 312 changes the sequence 120 of notional points-of-view 72 for the second spatial audio content item $10_2$ which changes the second trajectory $122_2$. The method 300 then repeats block 310. If the cost of transition is still too large, then the method at block 314 changes the first trajectory $122_1$ to reduce the cost.

At block 316, there is the rendering of a sequence of sound scenes selected by the first trajectory $122_1$ within the first spatial audio content item $10_1$ and then by the second trajectory $122_2$ within the second spatial audio content item $10_2$. In this way a last portion of the first spatial audio content item $10_1$ rendered according to the last portion of the first trajectory $122_1$ is similar to the first portion of the second spatial audio content item $10_2$ rendered according to the first portion of the second trajectory $122_2$. Similarity may be determined in a number of different ways. For example, similarity may be determined based on clustering within a parameter space or may be based upon a cost function that is implicitly or explicitly defined. A cost function may, for example, be implicitly defined using machine learning, for example by using a deep neural network.

A desired level of similarity may be achieved by for example changing a last portion of the first trajectory $122_1$, a first portion of the second trajectory $122_2$, the first spatial audio content item $10_1$ and/or the second spatial audio content item $10_2$. Thus, for example, if a desired level of similarity cannot be achieved by varying one or other or both of the first trajectory $122_1$ and the second trajectory $122_2$, then one, other or both of the first spatial audio content item $10_1$ and the second spatial audio content item $10_2$ may be replaced or moved within the playlist 140.

The cost function may be used to assign a cost for a putative trajectory through the first spatial audio content item $10_1$ and the second spatial audio content item $10_2$. Optimizing the value produced by the cost function can be used to determine at least a portion of the first trajectory $122_1$ and/or the second trajectory $122_2$. For example, the cost function can evaluate a change on transition from the first spatial audio content item $10_1$ to the second spatial audio content item $10_2$.

The similarity required between the first trajectory $122_1$ and the second trajectory $122_2$ may be defined in various ways using various different parameters.

For example, stylistic similarity may be determined based on parameters selected from one or more of; spectral frequencies, pitch, key, melody, instrumentation, voice, mood, sound object timbre, style (hard, mellow, improvising). The parameters may be obtained via metadata which may be stored in association with the spatial audio content 10 or which may be generated by automatically processing the spatial audio content 10.

In other examples, similarity can additionally or alternatively be measured in terms of similarity of content type such as music, sport, entertainment, news, art so that content items having the same type such as news are similar and others less similar. In another example, similarity can be measured in terms of language or in terms of what languages the user understands (with items in the same language being most similar and lower similarity obtained for other languages which the user understands but less well).

In other examples, the similarity can be measured in terms of spatial continuity. For example, if the sound sources rendered for the first spatial audio content item $10_1$ are front-focused (most or loudest sound sources are in the front) then similarity is achieved if the second spatial audio content item $10_2$ is rendered with front-focus meaning that most or the loudest sound sources are in the front. Thus, the spatial distribution of sound sources relative to a trajectory 122 can be used as criteria for judging similarity.

In some examples, the similarity may be a weighted combination of different criteria (different similarities). It may, for example, be a differently weighted combination of timbral similarity, stylistic similarity and spatial similarity. It will be appreciated, that the parameters that are used to determine the similarity between different spatial audio content can also be those parameters that change with the change in trajectory 122.

Thus, in one example the first spatial audio content item $10_1$ relates to content that is different than the second spatial audio content item $10_2$. The first trajectory $122_1$ within the first spatial audio content item $10_1$ results in the rendering of that content in a language that the user understands. The second trajectory $122_2$ may, for example, be adapted so that the second spatial audio content item $10_2$ is rendered to the user in the same language or in another language that the user understands.

In another example, the first trajectory $122_1$ within the first spatial audio content item $10_1$ results in the rendering of that content using a first commentator and the second trajectory $122_2$ results in the second spatial audio content item $10_2$ being rendered to the user using the same or a similar commentator.

In another example, the first trajectory $122_1$ within the first spatial audio content item $10_1$ results in the rendering of content that has a first difficulty level and the second trajectory $122_2$ within the second spatial audio content item $10_2$ results in the rendering of content that has the same or a similar difficulty level.

In another example, the first trajectory $122_1$ within the first spatial audio content item $10_1$ results in the rendering of content on a first topic and the second trajectory $122_2$ within the second spatial audio content item $10_2$ results in the rendering of content that has the same or a similar topic.

Further details of the second mode examples described and developments of the second mode examples described can be understood from the following use cases for the second mode:

In some but not necessarily all examples, a single notional point-of-view is used for each rendering of a spatial audio content item $10_i$. In this case the sequence 120 (and the trajectory 122) for a spatial audio content item is a single point-of-view 72. However, that single point-of-view 72 may be selected from multiple available points-of-view. At different times of playing the same content item, a different notional point-of-view is selected for controlling rendering. For example, different sets of instruments play the same song or the same content is repeatedly played with stylistic differences.

A thematic seed or input may be used to control the change in point-of-view with each rendering. For example, a certain instrument(s) or certain style may be favoured over other instruments or styles.

In some but not necessarily all examples, and as illustrated in FIGS. 10A and 10B, multiple spatial audio content items $10_i$ are played in a playlist 140 using a trajectory 122 through the multiple spatial audio content items $10_i$ of the playlist 140. The route of the trajectory is dependent upon the multiple spatial audio content items $10_i$.

FIG. 10A is an example illustration of a first spatial audio content item $10_1$. The first spatial audio content item $10_1$ defines multiple different zones $30_A$, $30_B$, $30_C$. In this example each of the multiple zones 30 has one or more sound sources 20. Each of the multiple zones 30 comprises one or more sweet spots. A sweet spot is a preferred listing location (preferred point-of-view 72). In the second mode, at a preferred point-of-view 72, the location is predefined and the orientation of the point-of-view may be predefined (0DoF) or defined by user orientation (3DoF) to define a notional point of view.

FIG. 10B is an example illustration of a second spatial audio content item $10_2$. The second spatial audio content item $10_2$ defines multiple different zones $30_A$, $30_D$. In this example each of the multiple zones $30_A$, $30_D$ has one or more sound sources 20. Each of the multiple zones $30_A$, $30_D$ comprises one or more sweet spots. A sweet spot is a preferred listing location (preferred point-of-view 72). In the second mode, at a preferred point-of-view 72, the location is predefined and the orientation of the point-of-view may be predefined (0DoF) or defined by user orientation (3DoF) to define a notional point of view.

The method 230, at block 234, automatically determines a sequence of notional points-of-view 72 of the virtual user 70 in dependence upon the spatial audio content 10. The sequence 120 of notional points-of-view 72 defines a trajectory 122 from the first spatial audio content $10_1$ to the second spatial audio content $10_2$. The trajectory 122 is determined to reduce dissimilarity (increased similarity) in the transition from the first spatial audio content item $10_1$ to the second spatial audio content item $10_2$. As previously described, the sequence of notional points-of-view of the user define a sequence of virtual sound scenes 78 rendered to the user.

In the particular example illustrated, the playlist 140 comprising, in order, the first spatial audio content item $10_1$ and the second spatial audio content item $10_2$ has a trajectory 122 that has a heavy emphasis on synthesizer sounds. When the user listens to the playlist, he will hear a timbrally continuous listening experience of synthesizer music.

FIG. 11 differs from FIGS. 10A and 10B in that the playlist 140 illustrated comprises three spatial audio content items $10_i$. Also, in this example, individual sound sources are not illustrated. Instead, the zones 30 are illustrated. In this example, the zones 30 are instrumental including a guitar dominant zone, a strings dominant zone and a percussion dominant zone.

Each spatial audio content item $10_i$ defines multiple different zones $30_A$, $30_B$, $30_C$. Each of the multiple zones 30 comprises one or more sweet spots. A sweet spot is a preferred listing location (preferred point-of-view 72). In the second mode, at a preferred point-of-view 72, the location is predefined and the orientation of the point-of-view may be predefined (0DoF) or defined by user orientation (3DoF) to define a notional point of view.

The method 230, at block 234, automatically determines a sequence of notional points-of-view 72 of the virtual user 70 in dependence upon the spatial audio content. The sequence 120 of notional points-of-view 72 defines a trajectory 122 from the first spatial audio content $10_1$ to the second spatial audio content $10_2$ to the third spatial audio content $10_3$. The trajectory 122 is determined to reduce dissimilarity (increased similarity) in the transition between the spatial audio content items. As previously described, the sequence of notional points-of-view of the user define a sequence of virtual sound scenes 78 rendered to the user.

In this example, a number of different possible trajectories $122_1$, $122_2$ for the playlist 140 are illustrated.

Each trajectory is defined by a sequence 120 of notional points-of-view 72 of the virtual user 70 that lie within a similar zone 30. The first trajectory $122_1$ is dominated by percussion. The first trajectory $122_1$ moves from zone $30_B$ of the spatial audio content item $10_i$ to zone $30_B$ the next spatial audio content item $10_{i+1}$. The first trajectory $122_1$ moves from a zone $30_B$ dominated by percussion to a zone $30_B$ dominated by percussion. The second trajectory $122_2$ is dominated by string instrumentation. The first trajectory $122_1$ moves from zone $30_C$ of the spatial audio content item $10_i$ to zone $30_C$ of the next spatial audio content item $10_{i+1}$. The second trajectory $122_2$ moves from a zone $30_C$ dominated by strings to a zone $30_C$ dominated by strings.

The similarity criteria that defines the trajectory 122 may be defined by the user. For example, the playlist style can be indicated by the user to be a percussion heavy playlist (first trajectory $122_1$) or a string dominant playlist (second trajectory $122_2$). The rendered sequence of virtual sound scenes 78 is determined by the trajectory 122.

If during playback, the user requests a change in the similarity criteria, for example a change from percussion to strings, then the trajectory 122 used for rendering may switch from the first trajectory $122_1$ to the second trajectory $122_2$.

FIG. 12 illustrates a playlist 140 and a method that is similar to that illustrated in FIG. 11. However, in this example the zones 30 are stylistic rather than instrumental. The instrumentation may be similar or different in different zones 30 of a content item $10_i$ but the style of playing is different. Stylistic differences can be amplified with instrumental differences. In this example, but not necessarily all examples, the different zones 30 correspond to hard playing, mellow playing and improvisation playing. In this example, the similarity criteria used for determining a trajectory 122 is stylistic similarity. A putative first trajectory $122_1$ moves between zones that are stylistically similar (improvisation) and a putative second trajectory $122_2$ is between zones that are stylistically similar (hard playing).

As before, the desired style can be indicated by a user. Furthermore, if during playback, the user requests a stylistic change, then a switch in trajectories can occur.

FIG. 13 illustrates a number of different isolated spatial audio content items $10_i$ each of which has a number of different zones 30. For each isolated spatial audio content item $10_i$, block 234 of the method 230 automatically determines a sequence of notional points-of-view of the virtual user in dependence upon the spatial audio content of that item. The sequence of notional points-of-view defines a trajectory 122. The trajectory 122 selects the rendered sequence of virtual sound scenes 78. In this example, the trajectories 122 are within a single spatial audio content item and they progress between different zones 30. In some examples, the trajectory 122 used for a particular spatial audio content item may be defined in metadata associated with the spatial audio content item.

Different zones 30 may be used to create different stylistic or instrumental sections for a content item. For example, referring to the first spatial audio content item $10_1$, when this content item is rendered there will be a progression from the notional points-of-view labelled 1, 2, 3 and there will be a stylistic progression from mellow (zone $30_A$) to improvisation (zone $30_B$) to hard (zone $30_C$). In this example, the second spatial audio content item $10_2$ is rendered with the same stylistic progression—mellow (zone $30_A$) to improvisation (zone $30_B$) to hard (zone $30_C$). mellow, improvisation, hard).

FIG. 14 illustrates an example in which the spatial audio content items $10_i$ illustrated in FIG. 13 are integrated into a playlist 140 and block 234 of the method 230 is used to determine a trajectory 122 through the playlist 140. The method automatically determines a sequence 120 of notional points-of-view 72 of the virtual user 70 in dependence upon the spatial audio content (the multiple audio spatial content items). The sequence 120 of notional points-of-view 72 defines a trajectory 122. The trajectory 122 may, for example, be determined by a measure of similarity required on transitioning between different spatial audio content items $10_i$. The trajectory 122 selects the rendered sequence of virtual sound scenes 78.

The trajectory 122 through a particular spatial audio content item $10_i$ may be dependent upon the previous spatial audio content item $10_{i-1}$ and/or the following spatial audio content item $10_{i+1}$. The trajectory 122 may, for example, be selected to optimize the overall experience for the playlist and may, for example, make transitions between content items lower cost and/or make transitions between zones within content items lower cost.

In the example illustrated one cost criteria is a similarity between how a content item ends and how the next content items begins. The similarity may, for example, be based upon similarity of style and/or instrumentation. In the example illustrated it is based upon style. The first spatial audio content item $10_1$ ends in a hard style (zone $30_C$) and the second audio content item $10_2$ starts in the same hard style (zone $30_C$). The next spatial audio content item $10_3$ does not have a mellow style (zone $30_A$), therefore the second spatial audio content item $10_2$ should end in the improvisation style (zone $30_B$) which exists in the third spatial audio content item $10_3$. The transition from the second spatial audio content item $10_2$ to the third spatial audio content item $10_3$ can therefore occur in the improvisation style e.g. between zones $30_B$.

Where there are multiple options for transitioning between one spatial audio content item and another spatial audio content item, then each of the possible transitions can be assessed and one chosen. The assessment may, for example, determine which of the transitions has the lowest cost according to a cost function which may for example determine which transitions are transitions between content that is most similar. For example, the hard part in a pop song may be used to transition to a smooth part in a heavy metal song.

As previously mentioned, similarity can be measured in terms of spectrum, pitch, key, melody, instrumentation, mood etc.

FIGS. 15 and 16 illustrate a consequence of introducing a new content item $10_n$ into a playlist 140 that already comprises spatial audio content items $10_1$, $10_2$, $10_3$. The introduction of the new content item $10_n$ introduces a number of new putative notional points-of-view 72 that may be used in the sequence 120 of notional points-of-view to define a trajectory 122 through the playlist 140 used for rendering. A new trajectory 122 therefore needs to be found that incorporates the new content item $10_n$. This may be achieved by a wholesale re-evaluation of the trajectory 122 through the playlist or, alternatively, by a local reevaluation of the playlist 140 so that the transitions to and from the new content item $10_n$ are acceptable cost-wise.

In this example the second spatial audio content item $10_2$ ends in an improvisation style (zone $30_B$) and this is therefore the style with which the next spatial audio content item, the new spatial audio content item $10_n$, is started. The new content $10_n$ ends in a style that can be matched to the next spatial audio content item $10_3$. It can be seen in this example (FIG. 16), that this results in a change in the trajectory 122 within the third spatial audio content item $10_3$ that follows the new content item $10_n$. Previously that content item $10_3$ had had a trajectory 122 of improvising (zone $30_B$) to hard (zone $30_C$) and now has a trajectory of hard (zone $30_C$) to improvising (zone $30_B$).

It will therefore be appreciated that this is a further example of how the block 234 of the method 230 can automatically determine a sequence 120 of notional points-of-view 72 of the virtual user 70 in dependence upon the spatial audio content 10. The sequence 120 of notional points-of-view 72 defines a trajectory 122 and this trajectory is used to select the spatial audio scenes rendered to the user.

It will be appreciated that in all of the preceding examples that reference is made to notional points-of-view 72. These may be points-of-view that are partially or wholly defined by data or other information associated with the spatial audio content 10. In other examples, they may be partially or wholly determined by user input. In other examples, they may be partially or wholly determined by analysis of the spatial audio content.

It will be appreciated from the foregoing descriptions that the user can, in some examples, cause a change in a trajectory 122 through a playlist 140. This may occur, for example, as a result of a deliberate selection by the user, for example a change in style or by the introduction or removal of a content item from a playlist.

It will also be appreciated that a local change to a trajectory may also result in a wider ranging change of trajectory. This is because the trajectory may be determined by optimizing over a scale greater than the original change to the trajectory.

In some, but not necessarily all examples, in order to achieve an optimum trajectory 122 the order of the content items within a playlist may be changed and/or the content items included within a playlist 140 may be changed.

FIG. 17 illustrates an example of a controller 210. Implementation of a controller 210 may be as controller circuitry. The controller 210 may be implemented in hardware alone, have certain aspects in software including firmware alone or can be a combination of hardware and software (including firmware).

As illustrated in FIG. 17 the controller 210 may be implemented using instructions that enable hardware functionality, for example, by using executable instructions of a computer program 206 in a general-purpose or special-purpose processor 202 that may be stored on a computer readable storage medium (disk, memory etc) to be executed by such a processor 202.

The processor 202 is configured to read from and write to the memory 204. The processor 202 may also comprise an output interface via which data and/or commands are output by the processor 202 and an input interface via which data and/or commands are input to the processor 202.

The memory 204 stores a computer program 206 comprising computer program instructions (computer program code) that controls the operation of the apparatus 100 when loaded into the processor 202. The computer program instructions, of the computer program 206, provide the logic and routines that enables the apparatus to perform the methods illustrated in FIGS. 1 to 8. The processor 202 by reading the memory 204 is able to load and execute the computer program 206.

The apparatus 100 therefore comprises:

at least one processor 202; and at least one memory 204 including computer program code the at least one memory 204 and the computer program code configured to, with the at least one processor 202, cause the apparatus 100 at least to perform:

i) in a first mode rendering sound scenes defined by a spatial audio content to a user, wherein a current sound scene is selected by a current point-of-view of the user; and ii) in a second mode, automatically determining, at least in part, a sequence of notional points-of-view of the user in dependence upon the spatial audio content; and rendering sound scenes defined by the spatial audio content to a user, wherein a sequence of sound scenes are selected by the sequence of notional points-of-view of the user.

As illustrated in FIG. 18, the computer program 206 may arrive at the apparatus 100 via any suitable delivery mechanism 220. The delivery mechanism 220 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 206. The delivery mechanism may be a signal configured to reliably transfer the computer program 206. The apparatus 100 may propagate or transmit the computer program 206 as a computer data signal.

Computer program instructions for causing an apparatus to perform at least the following or for performing at least the following:

in a first mode rendering sound scenes defined by a spatial audio content to a user, wherein a current sound scene is selected by a current point-of-view of the user; and in a second mode, automatically determining, at least in part, a sequence of notional points-of-view of the user in dependence upon the spatial audio content; and rendering sound scenes defined by the spatial audio content to a user, wherein a sequence of sound scenes are selected by the sequence of notional points-of-view of the user.

The computer program instructions may be comprised in a computer program, a non-transitory computer readable medium, a computer program product, a machine readable medium. In some but not necessarily all examples, the computer program instructions may be distributed over more than one computer program.

Although the memory 204 is illustrated as a single component/circuitry it may be implemented as one or more separate components/circuitry some or all of which may be integrated/removable and/or may provide permanent/semi-permanent/dynamic/cached storage.

Although the processor 202 is illustrated as a single component/circuitry it may be implemented as one or more separate components/circuitry some or all of which may be integrated/removable. The processor 202 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks and steps illustrated in the FIGS. 1 to 16 may represent steps in a method and/or sections of code in the computer program 206. The illustration of a particular order to the blocks does not necessarily imply that there is a required or preferred order for the blocks and the order and arrangement of the block may be varied. Furthermore, it may be possible for some blocks to be omitted.

FIG. 19 illustrates an example of an apparatus 100. The apparatus 100 is configured to enable first person perspective mediated reality. For example, the apparatus may include circuitry 250 that is capable of tracking a user's point-of-view 42 (e.g. 3DoF, 3DoF+, 6DoF), for example, by tracking movement of a user's head while they are wearing the apparatus 100, as a head mounted apparatus, or are wearing a head-mounted tracking device communicating with the apparatus 100. For example, the apparatus may include circuitry 250 that is capable of tracking a user's location or movement by tracking movement of a user or a user's body in space.

The head mounted device or apparatus may, in some but not necessarily all examples, include a head-mounted display for one or both eyes of the user 40.

The apparatus 100 comprises a decoder 252 for decoding the spatial audio content 10. The decoding produces the spatial audio content 10 in a format that can be used to identify and separately process sound sources 20.

The decoded spatial audio content 10 is provided to rendering control block 254 that performs the method 230. The rendering control block 254 is configured to enable first person perspective-mediated reality with respect to the spatial audio content 10 and takes into account the point-of-view 42 of the user 40. The rendering control block 254 is configured to identify and control each sound source 20 separately if required.

In some but not necessarily all examples, the audio signal is input to the rendering control block 254. The audio signal is fed to a delay line, and the direct sound and directional early reflections are read at suitable delays. Early reflections can be used for simulating room acoustics.

The delays corresponding to early reflections can be obtained by analysing the time delays of the early reflections from a measured or idealized room impulse response.

The direct sound is fed to a source directivity and/or distance/gain attenuation modelling filter $T0(z)$. The attenuated and directionally-filtered direct sound is then passed to s reverberator.

The output of the filter $T0(z)$ is also fed to a set of head-related transfer functions (HRTF) filters which spatially positions the direct sound to the correct direction with regard to the listener head.

Each early reflection may be fed to a source directivity and/or distance/gain attenuation modelling filter $Ti(z)$ and then the output of the filter is fed to a HRFT filter to maintain spatial position.

Finally, the HRFT-filtered direct sound and early reflections and the non-HRTF-filtered reverberation are summed to produce the signals for the left and right ear for binaural reproduction.

The orientation can be used to update the directions of the direct sound and early reflections, as well as sound source directionality, depending on user head orientation.

The location can be used to update the directions and distances to the direct sound and early reflections. The distance affects the distance/gain attenuation by decreasing the gain inversely proportionally to the distance. In addition, distance and user position can affect the ratio of direct sound to reverberation and/or the delays and positions of early reflections.

In this example the rendering control block 254 and the renderer 256 are housed within the same apparatus 100, in other examples, the rendering control block 254 and the renderer 256 may be housed in separate devices.

The rendering control block 254 provides a control output to the renderer 256 which may be one or more loudspeakers, for example. The loudspeakers may be arranged around a user or have be part of a headset worn by the user.

In some of the preceding examples, the spatial audio content 10 and the sound sources have been music based. However, this is not always the case. Other content is possible.

Where a structural feature has been described, it may be replaced by means for performing one or more of the functions of the structural feature whether that function or those functions are explicitly or implicitly described.

In some but not necessarily all examples, the apparatus 100 is configured to communicate data from the apparatus 100 with or without local storage of the data in a memory 204 at the apparatus 100 and with or without local processing of the data by circuitry or processors at the apparatus 100.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The apparatus 100 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 100 where it may produce an output sensible to the subject such as an audio output, visual output or haptic output.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data.

Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning, then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising
   at least one processor; and
   at least one non-transitory memory including computer program code;
   the at least one memory and the computer program code configured to, with the at least one processor, cause the apparatus at least to perform:
   render a current virtual sound scene defined by a spatial audio content to a user in a first mode, wherein the current virtual sound scene is selected based on a current point-of-view of the user;
   determine, at least in part, a sequence of notional points-of-view of the user in dependence upon the spatial audio content in a second mode;
   determine a trigger to switch from the first mode to the second mode; and
   render a sequence of virtual sound scenes defined by the spatial audio content to the user in the second mode in response to the determined trigger, wherein the sequence of virtual sound scenes are selected based on the sequence of notional points-of-view of the user.

2. An apparatus as claimed in claim 1, wherein the first mode enables N degrees of freedom mediated reality where N=6 or 3 and the second mode enables M degrees of freedom mediated reality where M=3 or 0, and M<N.

3. An apparatus as claimed in claim 1, wherein a point-of-view is a combination of location and orientation, and wherein determining, at least in part, the sequence of notional points-of-view of the user in dependence upon the spatial audio content comprises respectively determining at least locations for the sequence of notional points-of-view of the user, wherein the sequence of notional points-of-view of the user are at least partially different from the current point-of-view of the user.

4. An apparatus as claimed in claim 3, wherein the current point-of-view of the user respectively determines a current orientation for the sequence of notional points-of-view of the user.

5. An apparatus as claimed in claim 1, wherein the spatial audio content comprises, in a playlist, first spatial audio content and second spatial audio content, wherein the first spatial audio content enables rendering to the user a first virtual sound scene defined based on the first spatial audio content and selected based on a notional point-of-view of the sequence of notional points of view of the user or the current point-of-view of the user;
   wherein the second spatial audio content enables rendering to the user a second virtual sound scene defined based on the second spatial audio content and selected based on a notional point-of-view of the sequence of notional points of view of the user or the current point-of-view of the user.

6. An apparatus as claimed in claim 5, further caused to perform, in the second mode:
   determine a first set of one or more notional points-of-view of the user for the first spatial audio content;
   determine a second set of one or more notional points-of-view of the user for the second spatial audio content;
   render first virtual sound scenes defined based on the first spatial audio content to the user, wherein the first virtual sound scenes are selected based on one or more notional points-of-view of the user from the determined first set of one or more notional points-of-view of the user and then render second virtual sound scenes defined based on the second spatial audio content to the user, wherein the second virtual sound scenes are selected based on one or more notional points-of-view of the user from the determined second set of one or more notional points-of-view of the user,
   wherein the selected one or more notional points-of-view of the user from the determined first set of one or more notional points-of-view of the user define a first trajectory of a virtual user through a first sound space, and the selected one or more notional points-of-view of the user from the determined second set of one or more notional points-of-view of the user define a second trajectory of the virtual user through a second sound space.

7. An apparatus as claimed in claim 6, further caused to perform, enable varying the first trajectory and/or the second trajectory.

8. An apparatus as claimed in claim 7, wherein enable varying the first trajectory and/or the second trajectory is user controlled during rendering the first and/or second virtual sound scenes defined based on the spatial audio content to the user, and/or wherein enable varying the first trajectory and/or the second trajectory is automatically controlled to vary the first and/or second trajectory with a subsequent rendering of the same content.

9. An apparatus as claimed in claim 6, wherein the first and second spatial audio content is associated with metadata comprising at least a first parameter,
   wherein the first trajectory and/or the second trajectory is based on at least the first parameter, and further caused to perform maintain similarity of the parameter across a transition between the first spatial audio content and the second spatial audio content.

10. An apparatus as claimed in claim 6, wherein the first trajectory and/or the second trajectory is based on both the first spatial audio content and the second spatial audio content.

11. An apparatus as claimed in claim 6, further caused to perform:
    determine a cost function that assigns a cost for a putative trajectory through the first spatial audio content and the second spatial audio content; and
    use the cost function to determine at least a portion of the first trajectory and/or the second trajectory.

12. An apparatus as claimed in claim 6, further configured to render a first portion of the first spatial audio content, according to a last portion of the first trajectory, to be stylistically similar to a first portion of the second spatial audio content, rendered according to the first portion of the second trajectory,
    wherein stylistic similarity is determined based on clustering within a parameter space, wherein parameters of the parameter space are selected from one or more of: spectral frequencies; pitch; key; melody; instrumentation; voice; mood; sound object timbre; or style.

13. An apparatus as claimed in claim 6, further caused to perform:
    change a last portion of the first trajectory;
    change a first portion of the second trajectory;
    change the first spatial audio content; or
    change the second spatial audio content.

14. A method comprising:
    rendering a current virtual sound scene defined based on a spatial audio content to a user in a first mode, wherein the current virtual sound scene is selected based on a current point-of-view of the user;
    determining, at least in part, a sequence of notional points-of-view of the user in dependence upon the spatial audio content in a second mode;
    determining a trigger to switch from the first mode to the second mode; and
    rendering a sequence of virtual sound scenes defined based on the spatial audio content to the user in the second mode in response to the determined trigger, wherein the sequence of virtual sound scenes are selected based on the sequence of notional points-of-view of the user.

15. A method as claimed in claim 14, wherein the first mode enables N degrees of freedom mediated reality where N=6 or 3 and the second mode enables M degrees of freedom mediated reality where M=3 or 0, and M<N.

16. A method as claimed in claim 14, wherein a point-of-view is a combination of location and orientation, and wherein determining, at least in part, the sequence of notional points-of-view of the user in dependence upon the spatial audio content comprises respectively determining at least locations for the sequence of notional points-of-view of the user.

17. A method as claimed in claim 16, wherein the current point-of-view of the user respectively determines a current orientation for the sequence of notional points-of-view of the user.

18. A method as claimed in claim 14, wherein the spatial audio content comprises, in a playlist, first spatial audio content and second spatial audio content, wherein the first spatial audio content enables rendering to the user a first virtual sound scene defined based on the first spatial audio content and selected based on a notional point-of-view of the sequence of notional points of view of the user or the current point-of-view of the user;
    wherein the second spatial audio content enables rendering to the user a second virtual sound scene defined based on the second spatial audio content and selected based on a notional point-of-view of the sequence of notional points of view of the user or the current point-of-view of the user.

19. A method as claimed in claim 18, comprising, in the second mode:
    determining a first set of one or more notional points-of-view of the user for the first spatial audio content;
    determining a second set of one or more notional points-of-view of the user for the second spatial audio content;
    rendering first virtual sound scenes defined based on the first spatial audio content to the user, wherein the first virtual sound scenes are selected based on one or more notional points-of-view of the user from the determined first set of one or more notional points-of-view of the user and then render second virtual sound scenes defined based on the second spatial audio content to the user, wherein the second virtual sound scenes are selected based on one or more notional points-of-view of the user from the determined second set of one or more notional points-of-view of the user,
    wherein the selected one or more notional points-of-view of the user from the determined first set of one or more notional points-of-view of the user define a first trajectory of a virtual user through a first sound space, and the selected one or more notional points-of-view of the user from the determined second set of one or more notional points-of-view of the user define a second trajectory of the virtual user through a second sound space.

20. A non-transitory computer readable medium comprising program instructions stored thereon for performing at least the following:
    render a current virtual sound scene defined by a spatial audio content to a user in a first mode, wherein the current virtual sound scene is selected based on a current point-of-view of the user;
    determine, at least in part, a sequence of notional points-of-view of the user in dependence upon the spatial audio content in a second mode;
    determine a trigger to switch from the first mode to the second mode; and
    render a sequence of virtual sound scenes defined by the spatial audio content to the user in the second mode in response to the determined trigger, wherein the sequence of virtual sound scenes are selected based on the sequence of notional points-of-view of the user.

* * * * *